(12) United States Patent
Iizuka et al.

(10) Patent No.: US 6,493,404 B1
(45) Date of Patent: Dec. 10, 2002

(54) RECYCLING INTEGRATOR CORRELATOR

(75) Inventors: Kunihiko Iizuka, Sakurai (JP); Daniel Senderowicz, Berkeley, CA (US)

(73) Assignees: Sharp Kabushiki Kaisha, Osaka (JP); Synchro Design, Berkeley, CA (US)

( * ) Notice: Subject to any disclaimer, the term of this patent is extended or adjusted under 35 U.S.C. 154(b) by 0 days.

(21) Appl. No.: 09/259,281

(22) Filed: Mar. 1, 1999

(51) Int. Cl.[7] ............................................... H04L 27/06
(52) U.S. Cl. ....................... 375/343; 375/142; 375/143; 375/150; 375/340
(58) Field of Search ................................ 375/343, 137, 375/142, 149, 150, 130, 143, 316, 340

(56) References Cited

U.S. PATENT DOCUMENTS

| | | | | |
|---|---|---|---|---|
| 4,707,839 A | * | 11/1987 | Andren et al. ............... | 375/150 |
| 6,009,118 A | * | 12/1999 | Tiemann et al. ............ | 375/150 |
| 6,058,139 A | * | 5/2000 | Horiguchi et al. .......... | 375/149 |
| 6,330,274 B1 | * | 12/2001 | Uehara ....................... | 375/150 |

FOREIGN PATENT DOCUMENTS

JP          3224329          10/1991

* cited by examiner

*Primary Examiner*—Stephen Chin
*Assistant Examiner*—Shuwang Liu
(74) *Attorney, Agent, or Firm*—Birch, Stewart, Kolasch & Birch, LLP

(57) ABSTRACT

An analog input signal that is sampled at a predetermined rate is multiplied by a corresponding binary code sequence, i.e. "+1" or "−1" by the multiplier. The output of this multiplier is applied in conjunction with a signal supplied by the negative feedback circuit to the analog integrator. The quantization circuit quantizes the output signal of the analog integrator into N levels and outputs a digital word. This digital word is delayed by a unit time interval by a digital delay circuit and then processed by the above mentioned negative feedback circuit. As a result of this signal magnitude reducing process, the required integrating capacitance can be minimized without risks of saturation effects. Additionally, the output is already in digital form as required by the subsequent system blocks.

15 Claims, 16 Drawing Sheets

RECYCLING INTEGRATOR CORRELATOR

FIELD OF THE INVENTION

The present invention relates to a correlating device for calculating the correlation between an analog input signal and binary-code sequence with respect to time, which is suitable for use, for example, as a correlating device for synchronizing an input signal and a binary-code sequence, or a correlating device for demodulating spread data into the original form, for example, in spread spectrum communications.

BACKGROUND OF THE INVENTION

As a correlating device, for example, one can use switched capacitor circuit as in FIG. 16, which directly calculates an analog signal Aout indicative of the correlation between an analog input signal Vin and a binary-code sequence a(i) with respect to time without converting the analog input signal into digital.

In such a correlating device, however, in order to prevent saturation before the calculation of the correlation completes, as the length of binary-code sequence becomes longer, it is required to increase the capacitance of an integration capacitor C101, that in turn increases the amount of parasitic capacitance. The presence of these parasitics translate into large power consumption in order to achieve the desired speed of operation.

Furthermore, in a general spread spectrum communication receiver, the functional blocks, such as path searcher, tracking controller or rake receiver, which follow the correlating device 101 are usually implemented by digital circuits. In this case, the output signal Aout of correlating device 101 has to be converted to a digital value before it is passed to those digital circuits. This conversion requires separate AD converter(s) and hence further increase of power consumption.

SUMMARY OF THE INVENTION

It is an object of the present invention to realize a correlating device capable of operating at low power consumption even at high operating speeds and for long binary-code sequences, that gives its output in digital form without using separate AD converters.

In order to achieve the above object, a correlator for calculating a correlation value between an analog input signal and a code sequence with respect to time, is characterized by a multiplier that multiplies a sampled analog input signal by a code from the code sequence; an analog integrator; a quantization circuit that quantizes an integrated value from the analog integrator; a digital accumulator that accumulates digital values outputted by the quantization circuit, and outputs a result of accumulation as the correlation value; and a negative feedback circuit that converts the digital value outputted by the quantization circuit to an analog value of inverse polarity; wherein the analog integrator integrates a sum of a negative feedback signal outputted by the negative feedback circuit and an output from the multiplier.

With this arrangement, the quantization circuit and the negative feedback circuit form a negative feedback loop, and therefore, compared with the case without a negative feedback loop, the absolute value of the integrated value of the analog integrator is reduced. Therefore, even when the length of code sequence becomes longer, it is possible to prevent the saturation of the integrated analog output without increasing the size of integrator capacitor which stores the integrated value, thereby realizing a correlator of small power consumption.

Furthermore, upon completing a computation with respect to all the values of the code sequence, the digital output of the digital accumulator indicates a correlation value between the analog input signal and the code sequence with respect to time. Thus, unlike the conventional arrangement wherein the correlation value of the analog signal integrator is subjected to AD conversion, it is possible to output a digital value indicative of a correlation value without providing an AD converter as a the second stage of the correlator.

Here, as in the conventional arrangement, in the case of converting the correlation value which is once output in a analog value and then converted into a digital value, as the maximum analog value is a product of the number of quantization levels and the quantization interval, it is difficult to increase the number of quantization levels, and thus a calculation with an improved precision is difficult to be achieved. Furthermore, another problem may arise due to limitations of the conversion rate of low-power AD converters, unless complex structures are used.

In contrast, the number of quantization levels L which can be outputted by the correlator according to the present invention is $(N-1) \cdot M+1$ wherein N is the number of quantization levels of the quantization circuit and M is a length of the code sequence. Therefore, without increasing the number of quantization levels of the quantization circuit, the number of quantization levels L of the correlator increases as the code sequence becomes longer.

As a result, it is possible to reduce the number of quantization levels N of the quantization circuit (for example, two or three quantization levels) to be smaller than the number of quantization levels L of the correlator (for example, 64 to 256), thus outputting a high precision correlation value with a simple circuit structure.

Incidentally, the maximum quantization error of the correlator having the above arrangement is determined by the maximum quantization error of the quantization circuit, and thus a small maximum quantization error of the correlator can be achieved which is less than twice as much as the maximum quantization error of the quantization circuit even when initialization is not performed.

In order to achieve a high precision correlation calculation, it is preferable that initializing means be provided, which, at the beginning of each cycle of the code sequence, adjust at least one of the integrated value of the analog integrator and a value indicated by an output of the quantization circuit, so that the integrated value and the value indicated by the output are equal.

With this arrangement, the integrated value of the analog signal integrator and the quantized value indicated by the output of the quantization circuit before computation of a correlation value starts coincide with each other. Thus, compared with the case where these values are different, the maximum quantization error can be reduced by half and a computation can be performed with a still improved precision.

The arrangement of the initialization is made by means of CDS (Correlated Double Sampling) operation, that sets a predetermined value of the output of the analog integrator and at the same time suppresses the low-frequency noise, thereby increasing the accuracy of the computation.

It may be also arranged so as to further include measuring means, which, prior to correlation computation, measure offset error of the correlator; and offset compensation means, which adjust a result of computation by the correlator, so that the offset error can be cancelled based on the offset error as measured, for example, by subtracting the offset error from the correlation value computed by the correlator, or adjusting beforehand the initial value of the digital accumulator according to the offset error.

With this arrangement, a natural offset error of the correlator in use can be cancelled, and thus a computation can be performed with an improved precision.

For a fuller understanding of the nature and advantages of the invention, reference should be made to the ensuing detailed description taken in conjunction with the accompanying drawings.

DESCRIPTION OF THE PREFERRED EMBODIMENTS

First Embodiment

Figure 1:
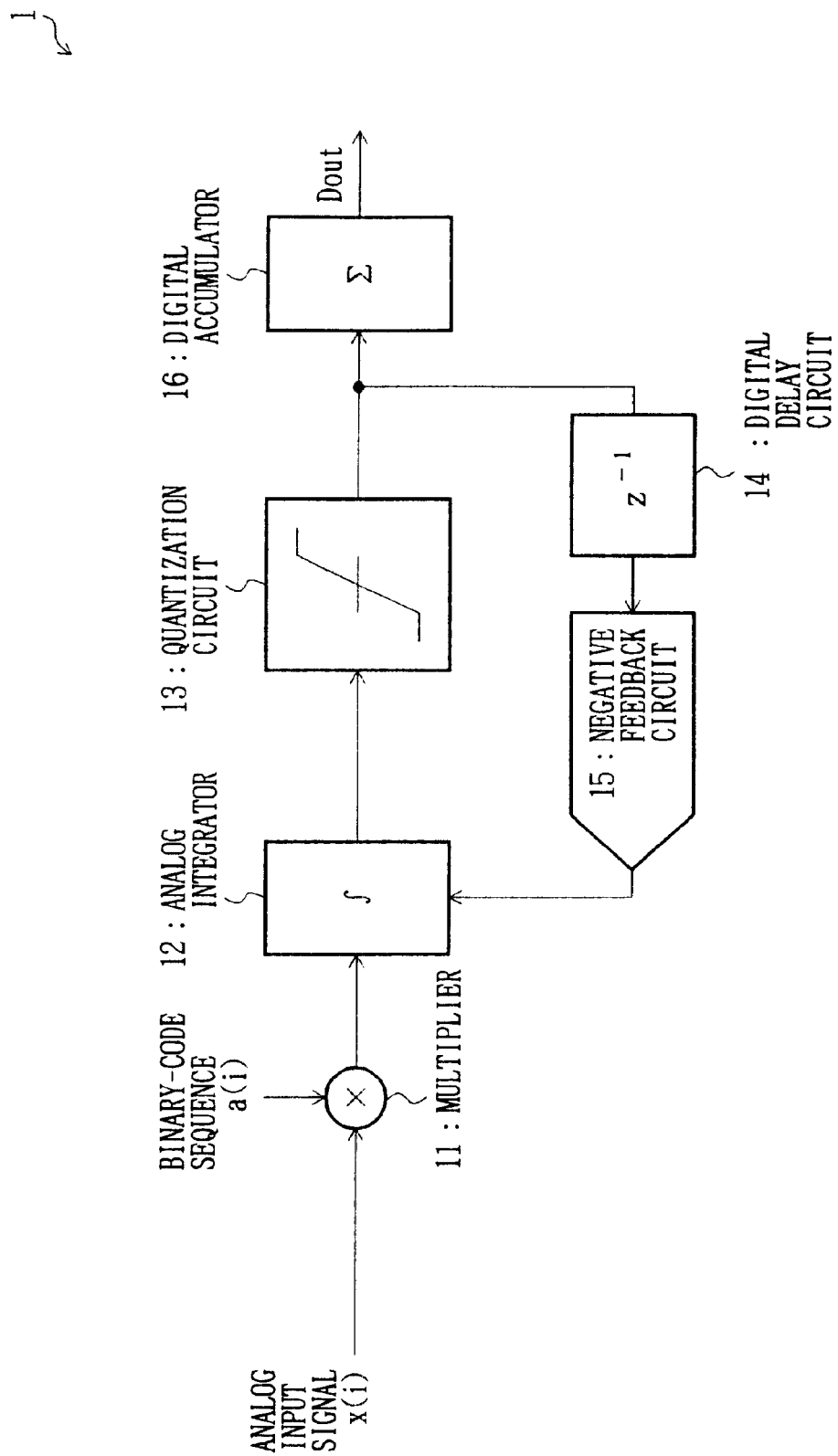
FIG. 1 is a block diagram showing the chief structure of a recycling integrator correlator according to one embodiment of the present invention.

The following description will explain a first embodiment of the present invention, while referring to FIG. 1. A correlator in accordance with the present embodiment is a recycling integrator correlator which calculates a correlation between an analog input signal and a binary-code sequence with respect to time using an analog integrator, wherein a negative feedback of a quantized output from the analog integrator to the analog integrator is performed. Specifically, as shown in FIG. 1, the recycling integrator correlator includes a multiplier 11, an analog integrator 12, a quantization circuit 13, a digital delay circuit 14, and a negative feedback circuit 15. The multiplier 11 is provided for multiplying a sampled analog input signal x(i) by a corresponding binary-code a(i) in a binary code sequence. The analog integrator 12 is provided for integrating an output of the multiplier 11. The quantization circuit 13 is provided for quantizing an output of the analog integrator 12. The digital delay circuit 14 is provided for delaying a digital output from the quantization circuit 13 by a unit time interval. The negative feedback circuit 15 is provided for performing negative feedback of an output of the digital delay circuit 14 to the input of the analog integrator 12. The recycling integrator correlator 1 further includes a digital accumulator 16 for accumulating digital outputs of the quantization circuit 13.

According to the above arrangement, a sampled analog input signal x(i) at time t(i) is multiplied by a corresponding binary-code a(i) in the binary code sequence, i.e., "+1" or "−1" by the multiplier 11. To the analog integrator 12, inputs are an output signal x(i)·a(i) of the multiplier 11 and an output signal S(i) of the negative feedback circuit 15, and these signals x(i)·a(i) and S(i) are added to the previous output signal Y(i−1) of the analog integrator 12.

Then, an output Y(i) of the analog integrator 12 at time t(i) is denoted as $$Y(i)=Y(i-1)+A\cdot\{a(i)\cdot x(i)+S(i)\} \qquad (1),$$

where A is the gain of the analog integrator 12.

The quantization circuit 13 quantizes the output signal Y(i) of the analog integrator 12 into N levels and outputs a digital word Q(i). This digital word Q(i) and the output signal Y(i) satisfy the following Eq. (2).

$$|Y(i)-(Q(i)\cdot D+Z)|<\Delta \qquad (2)$$

where the positive numbers D, Δ and the number z denote the quantization interval, the maximum quantization error and a zero level (offset) of the quantization circuit 13 respectively.

The digital output Q(i) of the quantization circuit 13 is delayed by a unit time interval at the digital delay circuit 14 and then taken by the negative feedback circuit 15 where the digital output Q(i) is converted into a corresponding signal S(i+1) at the next sampling time t(i+1). The delay time of the digital delay circuit 14 is set such that the above signal S(i+1) resulting from the computation at a sampling time t(i) is computed with the signal output x(i+1)·a(i+1) of the multiplier 11 at the next sampling time t(i+1), and a coefficient of the negative feedback circuit 15 is set to S(i+1)=−(Q(i)·D+Z)/A. Thus, the above Eq. (1) can be rewritten into the following Eq. (3).

$$Y(i)=Y(i-1)+A\cdot a(i)\cdot x(i)-(Q(i-1)\cdot D+Z) \qquad (3)$$

The recycling integrator correlator 1 in accordance with the present embodiment includes a negative feedback loop, and thus an absolute value for an output signal Y(i) of the analog integrator 12 becomes smaller than that obtained from the conventional arrangement wherein an output [Y(i−

1)+A·a(i)·x(i)] resulting from summing products of the analog input signal x(i) and the binary-code sequence a(i). As a result, the required integration capacity for preventing saturation of the output of the analog integrator 12 can be reduced significantly. Even if the length M of a binary code sequence becomes longer, for example above 128, the operating speed can be increased without increasing the power consumption of the analog integrator 12.

An output Y(M) of the analog integrator 12 when computing an entire binary code sequence (a(1) to a(M)) having a code length M and a corresponding analog input signal (x(1) to x(M)) is denoted as:

$$Y(M) = Y(0) + A \cdot \sum_{i=1}^{M} a(i) \cdot x(i) - \left( D \cdot \sum_{i=0}^{M-1} Q(i) + M \cdot z \right) \quad (4)$$

This Eq. (4) can be modified to the following Eq. (5).

$$\{Y(M) - D \cdot Q(M) - Z\} - \{Y(0) - D \cdot Q(0) - Z\} = \quad (5)$$

$$A \cdot \sum_{i=1}^{M} a(i) \cdot x(i) - \left( D \cdot \sum_{i=1}^{M} Q(i) + M \cdot z \right)$$

Here, since the above Eq. (2) holds, the following Eq. (6) can be derived from the above Eq. (5).

$$\left| \sum_{i=1}^{M} a(i) \cdot x(i) - \left( \frac{D}{A} \cdot \sum_{i=1}^{M} Q(i) + \frac{M \cdot Z}{A} \right) \right| < 2 \cdot \frac{\Delta}{|A|} \quad (6)$$

Thus, digital outputs of the digital accumulator 16, i.e., ΣQ(i) obtained by accumulating output values Q(i) of the quantization circuit 13 from i=1 to M becomes an index indicating a quantized value of the analog correlation value Σa(i)·x(i), and a quantization error can be suppressed to below 2·Δ/|A|. Incidentally, ΣQ(i) takes values in the number (N−1) M+1, and the quantization interval is D/|A|.

As a result, the recycling integrator correlator 1 in accordance with the present embodiment offers the effects of not only preventing saturation of an output of the analog integrator 12 by the negative feedback loop but also directly outputting a digital value Dout without providing an AD converter (Analog Digital Converter) at the second stage of the correlator.

In a general spread spectrum communications receiver, the functional blocks such as path searcher, tracking controller or rake receiver that follow the correlating device are usually implemented by digital circuits. Thus, the output of the correlating device has to be converted to a digital form to be passed to those digital circuits. This conversion poses some problems related to the resolution, dynamic range and conversion rate that this analog-to-digital converter has to be capable of providing in order to meet the performance specifications. Furthermore, the conversion requires separate AD converter(s) and hence further increase of power consumption.

In contrast, according to the structure of the present embodiment, the quantization error of the recycling integrator correlator is determined by the quantization error of the quantization circuit 13. Furthermore, the number of quantization levels L which can be outputted by the correlator 1 is (N−1)·M+1 wherein the number of integration is the sequence length M, and thus N is the number of quantization levels of the quantization circuit 13. Thus, the number of quantization levels can be increased as the sequence length M increases without increasing the size of the integrating capacitor of the analog integrator.

The digital accumulator 16 of the present embodiment is simply arranged so as to accumulate the output values Q(i) of the quantization circuit 13 for each binary code a(i) of the digital code sequence, a digital correlation output Dout indicative of the correlation value can be output at higher speed than the case of adopting a successive approximation type AD converter at the second stage of the correlator.

Here, it is preferable that the analog integrator 12 and the quantization circuit 13 are initialized at the beginning of a correlation calculating period so as to satisfy the condition of Y(0)=Q(0)·D+Z wherein Y(0) is an output of the analog signal integrator 12, and a digital value Q(0) is an output of the quantization circuit 13. In this case, Eq. (5) and Eq. (6) can be rewritten into the following Eq. (7) and Eq. (8) respectively.

$$Y(M) - D \cdot Q(M) - Z = A \cdot \sum_{i=1}^{M} a(i) \cdot x(i) - \left( D \cdot \sum_{i=1}^{M} Q(i) + M \cdot z \right) \quad (7)$$

$$\left| \sum_{i=1}^{M} a(i) \cdot x(i) - \left( \frac{D}{A} \cdot \sum_{i=1}^{M} Q(i) + \frac{M \cdot Z}{A} \right) \right| < \frac{\Delta}{|A|} \quad (8)$$

As a result, the quantization error of the recycling integrator correlator 1 can be reduced below Δ/|A| or by half of that comparing with the other case than in Eq. (7) and Eq. (8), i.e., in the case of Eq. (5) and Eq. (6).

Second Embodiment

Figure 2:
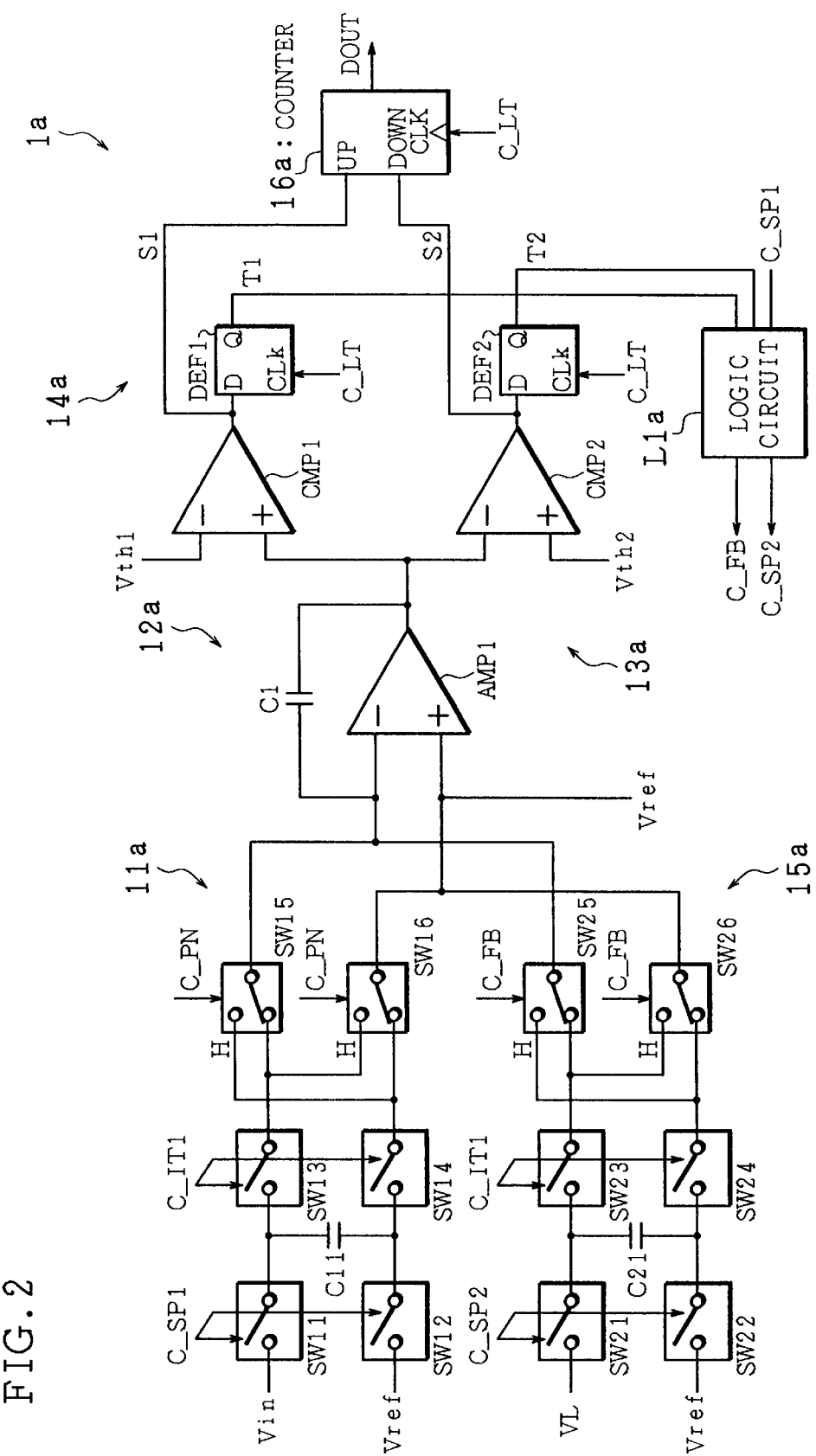
FIG. 2 is a circuit diagram showing the chief structure of a recycling integrator correlator according to another embodiment of the present invention.
Figure 3:
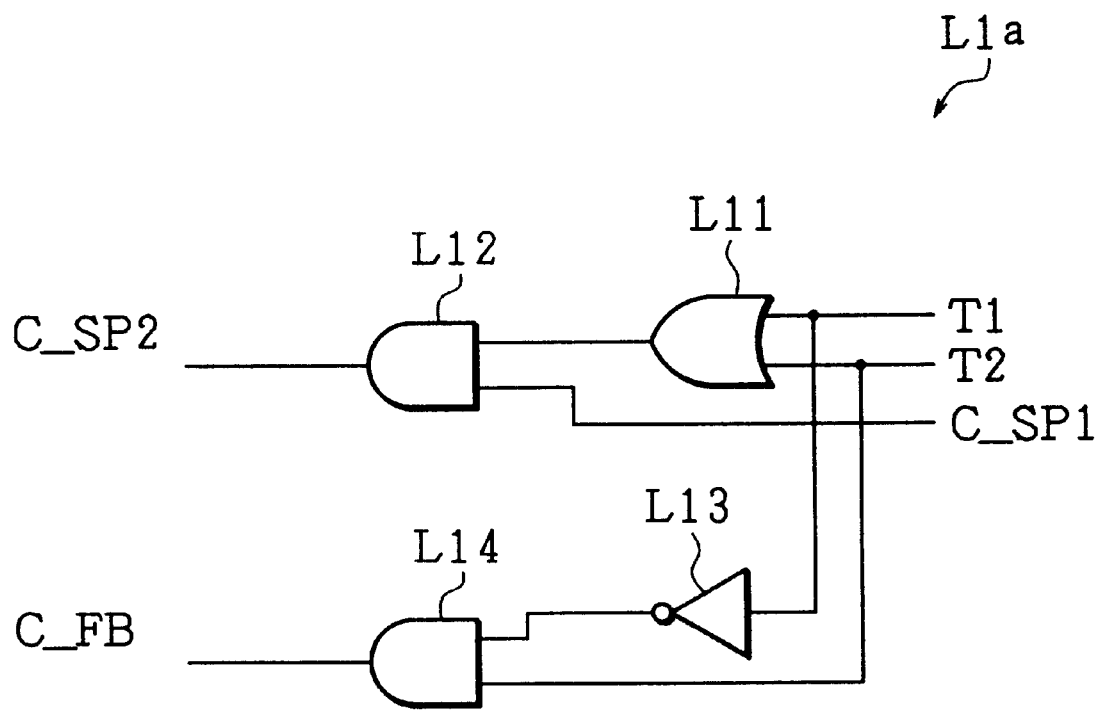
FIG. 3 is a circuit diagram showing an example of a structure for a logic circuit provided in the foregoing recycling integrator correlator.
Figure 4:
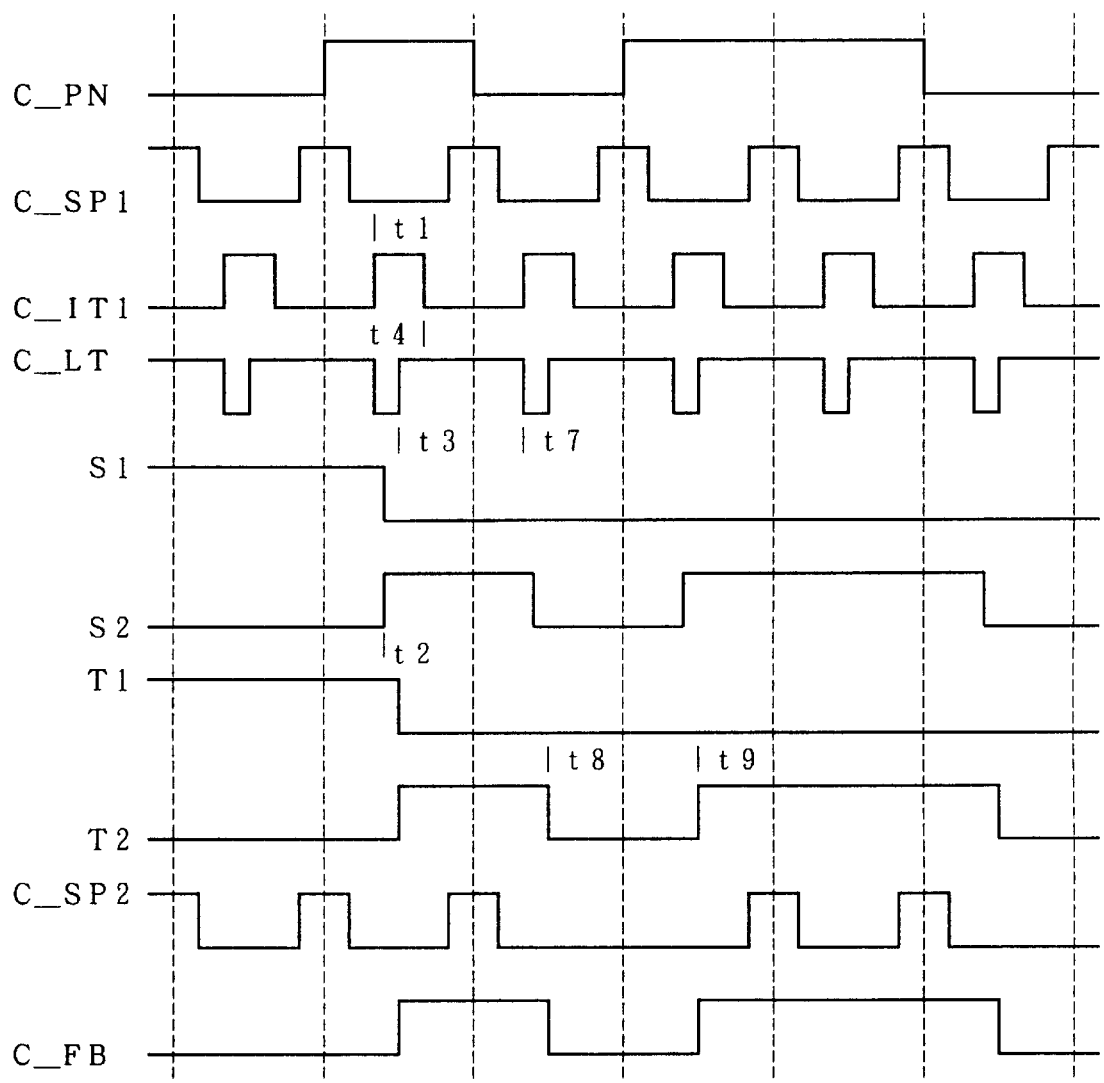
FIG. 4 is a timing chart showing the operations of the foregoing recycling integrator correlator.

The following descriptions of the present embodiment will explain a concrete example of the recycling integrator correlator 1 in reference to FIG. 2 through FIG. 4. As shown in FIG. 2, a recycling integrator correlator 1a in accordance with the present embodiment adopts a switched capacitor type analog integrator 12a as an analog integrator 12, and a quantization circuit 13a which quantizes an output signal Y(i) of the analog integrator 12a into three levels.

Specifically, the analog signal integrator 12a includes an MOS (Metal Oxide Semiconductor) operational amplifier AMP 1, an integrating capacitor C1 provided between an inverting input terminal and an output terminal of the MOS operational amplifier AMP1, and a sampling capacitor C11 for accumulating charge corresponding to an analog input signal. To one terminal of the sampling capacitor C11, a voltage Vin indicative of an analog input signal is applied via the sampling switch SW11, and a reference voltage Vref is applied via a sampling switch SW12 which is switched interlocking with the sampling switch SW11.

Furthermore, a switch SW13 is provided between a terminal on the side of the sampling switch SW11 of the sampling capacitor C11 and the inverting input terminal of the MOS operational amplifier AMP1, and a switch SW14 interlocking with the switch SW13 is provided between the terminal on the side of the sampling switch SW12 of the sampling capacitor C11 and the non-inverting input terminal of the MOS operational AMP1. Furthermore, to the non-inverting input terminal of the MOS operational AMP1, a reference voltage Vref is applied. Each of the switches SW11 through SW14 or other switches to be described later may be composed by a single MOS transistor or a pair of complementary MOS transistors.

Additionally, as the multiplier 11, multiplexers SW15 and SW16 are provided between the MOS operational amplifier AMP1 and the switches SW15 and SW16. Specifically, a common contact of the multiplexer SW15 is connected to an inverting input terminal of the operational amplifier AMP1. One of individual contacts of the multiplexer SW15 is connected to the switch SW13, and the other individual contact is connected to the switch SW14. Similarly, the common contact of the multiplexer SW16 is connected to the non-inverting input terminal of the MOS operational amplifier AMP1, and individual contacts are connected to the switches SW13 and SW14, respectively. The switches SW15 and SW16 interact according to the control signal C_PN. When a binary code a(i) of the binary-code sequence is "+1", i.e., when the control signal C_PN is "high" level, the switch SW15 connects the switch SW14 and the inverting input terminal, and the switch SW16 connects the switch SW13 and the non-inverting input terminal. On the other hand, when a binary value of the binary-code sequence is "−1", i.e., when the control signal C_PN is "low" level, the switch SW15 connects the switch SW13 and the inverting input terminal, and the switch SW16 connects the switch SW14 and the non-inverting input terminal.

Opening/closing of switches the SW11 to SW14 is controlled at a timing shown in FIG. 4 by a control signal C_SP1 or C_IT1 from a timing control circuit (not shown). These control signals are periodic signals for sampling and integrating respectively, and the multiplexers SW15 and SW16 select the side as specified by the control signal C_PN from the timing control circuit.

As a result, the switches SW11 and SW12 are closed at each sampling time t(i) by the control signal C_SP1, and are opened after an amount of charge according to a voltage Vin indicative of an analog input signal is accumulated on the sampling capacity C11. Furthermore, when the switches SW11 and SW12 are open, the switches SW13 and SW14 are closed according to a control signal C_IT1, and are opened after an amount of charge accumulated on the sampling capacitor C11 is moved to the integrating capacitor C1.

The control signal C_PN is switched to a level indicating a binary code a(i) corresponding to a current period of the binary code sequence before the switches SW13 and SW14 are closed. The multiplexers SW15 and SW16 apply an accumulated amount of charge to the integrating capacitor C1 as it is or after inverting its sign according to the control signal C_PN. As a result, the analog signal integrator 12a can calculate the sum of products of the analog input signal x(i) and a binary code a(i) of the binary code sequence. The timing control circuit can be realized by a circuit of a relatively simple structure such as a sequential circuit which operates according to a reference clock of a predetermined frequency.

On the other hand, the quantization circuit 13a of the present embodiment quantizes the output Y(i) of the analog signal integrator 12a, i.e., an output value of the MOS operational amplifier AMP1 into three levels ① a level larger than the threshold value Vth1, ② a level between the threshold values Vth1 and Vth2 and ③ a level smaller than the threshold value Vth2. The quantization circuit 13a includes a comparator CMP1 and a comparator CMP2. The comparator CMP1 compares the output of the MOS operational amplifier AMP1 with a threshold voltage Vth1 and the comparator CMP2 compares the output of the operational amplifier AMP1 with a threshold voltage Vth2, where Vth1=D/2, and Vth2=−D/2.

The digital delay circuit 14a of the present embodiment includes a D-type flip-flop DFF1, a D-type flip-flop DFF2 and a logic circuit L1a. The D-type flip-flop DFF1 delays the output signal S1 of the MOS comparator CMP1, and the D-type flip-flop DFF2 delays the output signal S2 of the MOS comparator CMP2. The logical circuit L1a generates the control signals C_FB and C_SP2 of the negative feedback circuit 15a by a logical operation of the outputs of the D-type flip-flops DFF1 and DFF2. The negative feedback circuit 15a includes switches SW21 to SW26 and a sampling capacitor C21 which are connected in the same manner as the switches SW11 to SW16 and the sampling capacitor C11 of the analog signal integrator 12a. It should be noted here that instead of a voltage Vin indicative of an analog input signal, a voltage VL to be set according to the value D shown in Eq. (3) can be applied to the sampling switch SW21. Another difference lies in that opening/closing of the switches SW21 and SW22 are controlled by the control signal C_SP2, and the multiplexers SW25 and SW26 are controlled by the control signal C_FB.

Each of the D-type flip-flops DFF1 and DFF2 holds a value applied to the input terminal D at a rise of the periodic clock C_LT until the periodic clock C_LT falls. On the other hand, when either of the output signals T1 and T2 of the D-type flip-flops DFF1 and DFF2 is "high" level, the logical circuit L1a outputs a control signal C_SP2 at the same timing as a control signal C_SP1 for instructing the analog signal integrator 12a to perform a sampling operation. The logical circuit L1a outputs a control signal C_FB of "low" level while the output signal T1 is "high" level, and outputs a control signal C_FB of "high" level while the output signal T2 is "high" level.

As shown in FIG. 3, the logical circuit L1a, for example, includes an OR circuit L11 for computing a logical OR of the output signals T1 and T2, and an AND circuit L12 for computing a logical AND of an output of the OR circuit L11 and a control signal C_SP1 and outputting the resulting logical AND as a control signal C_SP2. The logical circuit L1a also includes a NOT circuit L13 for computing a NOT of the output signal T1 and an AND circuit L14 for computing a logical AND of an output of the NOT circuit L13 and an output signal T2 and outputting the resulting logical AND as a control signal C_FB.

In the described arrangement, when the output voltage of the MOS operational amplifier AMP1 becomes smaller the threshold value Vth2, the output signal S2 of the MOS comparator CMP2 is switched to "high" level (at t2 in FIG. 4). Furthermore, when the periodic clock C_LT rises (at time t3), the D-type flip flop DFF2 holds an output signal S2 at time t3 as output signal T2 until the periodic clock C_LT falls (period from t3 to t7).

In this state, as an output signal T2 is "high" level, a control signal C_SP2 is output from the logical circuit L1a at the same timing as the control signal C_SP1 for instructing the analog signal integrator 12a to perform a sampling of the analog input signal Vin, and thus instructing the negative feedback circuit 15a to sample the voltage VL. As a result, both of the switches SW21 and SW22 of the negative feedback circuit 15a are closed, and an amount of charge according to the voltage VL is accumulated on the sampling capacitor C21.

In this state, since the output signal T2 is "high" level, a control signal C_FB of "high" level is applied. Therefore, in the negative feedback circuit 15a, when the switches SW23 and SW24 are closed in the integration period (the period from t1 to t4) of the control signal C_IT1, the multiplexers SW25 and SW26 connect the terminal on the switch SW24 side of the sampling capacitor C21 to the inverting input terminal of the MOS operational amplifier AMP1, and connect the terminal on the switch SW23 side of the sampling capacitor C21 to the non-inverting input terminal of the MOS operational amplifier AMP1. As a result, the charge accumulated on the electrode connected to the inverting input of the amplifier is reduced also by an amount according to charge C21·VL other than the amount reduced according to a product of the analog input signal Vin and the a(i) of the binary code sequence. As a result, the output voltage of the analog integrator 12a is driven towards the reference voltage Vref by an amount of the voltage (C21/C1)·VL.

On the other hand, when the output voltage of the MOS operational amplifier AMP1 is greater than the threshold value Vth1, since the output signal T1 of the D-type flip-flop DFF1 is switched to "high" level at a next rise of the periodic clock C_LT, the control signal C_FB is switched to "low" level as in the period before t3. As a result, when the switches SW23 and SW24 are switched ON, the multiplexers SW25 and SW26 connect the terminal on the side of the switch SW24 of the sampling capacitor C21 to the non-inverting input terminal of the MOS operational amplifier AMP1, and connect the terminal on the side of the switch SW23 of the sampling capacitor C21 to the inverting input terminal of the MOS operational amplifier AMP1. As a result, the charge accumulated on the electrode connected to the inverting input of the amplifier AMP1 is increased by an amount according to charge C21·VL. As a result, an output voltage of the analog integrator 12a is driven towards the reference voltage Vref by an amount of the voltage (C21/C1)·VL.

In the case where the output voltage of the MOS operational amplifier AMP1 is between the threshold values Vth1 and the threshold value Vth2, at the next rise of the periodic clock C_LT, both the output signals T1 and T2 of the D-type flip flops DFF1 and DFF2 are switched to "low" level (period from t8 to t9). In this state, the control signal C_SP2 is held in the "low" level, and the switches SW21 and SW22 of the negative feedback circuit 15a remain OFF. Therefore, the control signal C_IT1 is switched to "high" level, and even when the switches SW23 and SW24 are switched ON, variations in an output voltage of the analog integrator 12a due to the voltage VL do not take place.

When the recycling integrator correlator 1a repeats the described operation, the output Y(i) of the analog integrator 12a is denoted by the following Eq. (9).

$$Y(i)=Y(i-1)+(C11/C1)\cdot a(i)\cdot Vin(i)-(C21/C1)\cdot Q(i-1)\cdot VL \qquad (9)$$

In the above Eq. (9), Q(i−1)=+1 ① when the control signal T1 is "high" level, and Q(i−1)=0 ② when both of the signals T1 and T2 are switched to "low" level, and Q(i−1)=−1 ③ when the signal T2 is switched to "high" level. Here, C1, C11 and C12 indicate the capacitances of the capacitors C1, C11 and C12 respectively.

In the present embodiment, respective values for circuit elements satisfy the conditions of C11=C12, C1/C1=C21/C1=A, VL=D/A and Z=0. Therefore, the output Y(i) of the analog integrator 12a is denoted by the following Eq. (10).

$$Y(i)=Y(i-1)+A\cdot a(i)\cdot Vin(i)-(Q(i-1)\cdot D+Z) \qquad (10)$$

which is the same as Eq. (3).

The output signal S1 of the MOS comparator CMP1 is applied to the up count terminal UP of the up-and-down counter 16a which is operated with the digital accumulator 16 shown in FIG. 1, and the output signal S2 of the MOS comparator CMP2 is applied to the down count terminal DOWN. The up-and-down counter 16a is synchronized with the periodic clock C_IT.

As a result, when the output voltage of the MOS operational amplifier AMP1 is larger than the threshold value Vth1, i.e., when the output signal S1 is "high" level at a rise of the periodic clock C_IT, the count value of the up-and-down counter 16a is increased by 1. On the other hand, when the output voltage of the MOS operational amplifier AMP1 is smaller than the threshold value Vth2, i.e., when the output signal S2 is "high" level at a rise of the periodic clock C_IT, the count value of the up-and-down counter 16a is decreased by 1.

When the output voltage is between the threshold voltage Vth1 and the threshold voltage Vth2, the count value for the up-and-down counter 16a remains unchanged.

As a result, the count value for the up-and-down counter 16a is given as ΣQ(i), and as shown by the above Eq. (6), the count value indicates an index of a quantized value of the correlation value between the analog input signal and the binary code sequence at a quantization interval |D/A|, and thus the quantization error is less than 2·A/|A|.

Incidentally, in the present embodiment, a digital value Dout expressing the correlation value was calculated using an up-and-down counter which increases or decreases a count value based on the signals T1 and T2, but, provided the same computation result can be calculated, other calculation methods may be used. For example, the amount of increase and the amount of decrease may be counted separately, and then the count value expressing the amount of decrease may be subtracted from the count value expressing the amount of increase. However, in the structures explained in the embodiments above, since the count value can be directly used as the digital value, computation can be performed faster.

Third Embodiment

Figure 5:
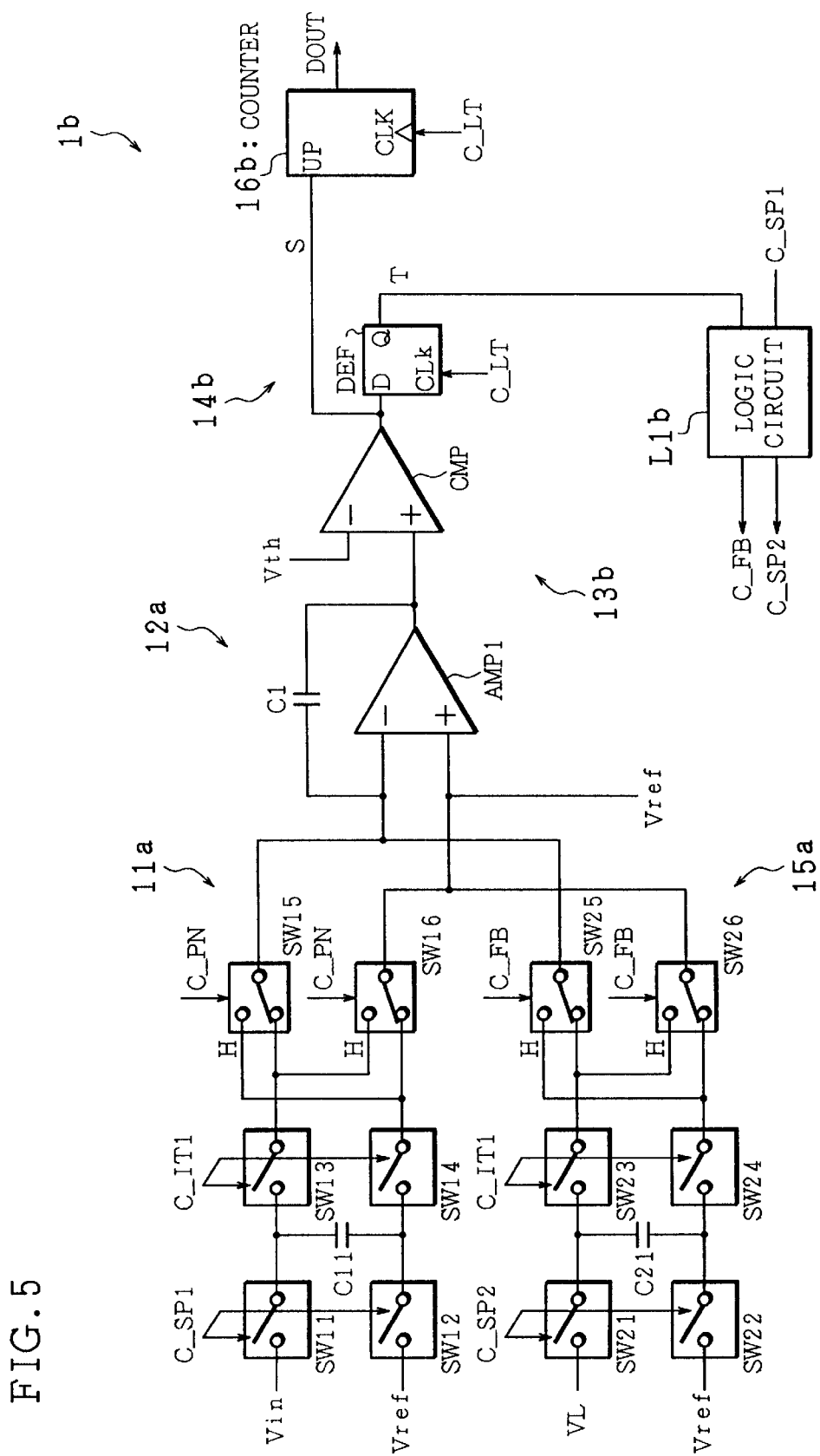
FIG. 5 is a circuit diagram showing the chief structure of a recycling integrator correlator according to a further embodiment of the present invention.

As another specific example of the recycling integrator correlator 1 shown in FIG. 1, the present embodiment will explain, with reference to FIG. 5, a structure in which a quantization circuit 13b performs quantization in two levels. Since a recycling integrator correlator 1b according to the present embodiment is similar to the recycling integrator correlator 1a shown in FIG. 2, members having the same functions will be given the same reference symbols, and explanation thereof will be omitted here.

The quantization circuit 13b according to the present embodiment, which is provided with a single MOS comparator CMP which compares the output voltage of the MOS operational amplifier AMP with a threshold value Vth (assumed Vth=0 here), quantizes the output voltage of the analog signal integrator 12a in two levels: below and above the threshold value Vth. A counter 16b is used, whose value is increased by 1 in synchronization with a periodic clock C_LT when the signal S is "high" level. Furthermore, a digital delay circuit 14b according to the present embodiment is provided with a D-type flip-flop DFF, which receives the signal S outputted by the MOS comparator CMP, and with a logic circuit Lib, which, based on a signal T outputted by the D-type flip-flop DFF and a control signal C_SP1, outputs control signals C_FB and C_SP2 to the negative feedback circuit 15a. The logic circuit L1b outputs as the control signal C_SP2 a signal with the same timing as the control signal C_SP1, and controls the control signal C_FB to "low" level when the output signal T is "high" level, and to "high" level when the output signal T is "low" level. In this way, when the signal T outputted by the D-type flip-flop DFF is "high" level, the charge accumulated in the sampling capacitor C21 is applied to the integrating capacitor C1 of the analog signal integrator 12a with the same sign, and applied with an inverted sign when output signal T is "low" level.

As a result, the signal Y(i) outputted by the analog signal integrator 12a, as in the foregoing Eq. (9) and Eq.(10), is as shown by Eq. (11) and Eq. (12) below, which are equivalent to the foregoing Eq. (3).

$$Y(i)=Y(i-1)+(C11/C1)\cdot a(i)\cdot Vin(i)-(C21/C1)\cdot(2\cdot Q(i-1)-1)\cdot VL \quad (11)$$

$$Y(i)=Y(i-1)+A\cdot a(i)\cdot Vin(i)-(Q(i-1)\cdot D+Z) \quad (12)$$

In Eq. (11) and Eq. (12), VL=D/(2·A), Z=−D/2, and Q(i−1) equals "+1" when the signal T is "high" level, and "0" when the signal T is "low" level. Furthermore, in Eq. (12), the values of each of the circuit elements are set the same as in Eq. (10) above.

Therefore, the count value of the counter 16b is ΣQ(i), and after accumulation of a sequence length of M times, as shown by Eq. (6), the count value indicates an index of a quantized value of the correlation value between the analog input signal and the binary code sequence at a quantization interval of |D/A|, and thus the quantization error is less than 2·Δ/|A|.

Fourth Embodiment

Figure 6:
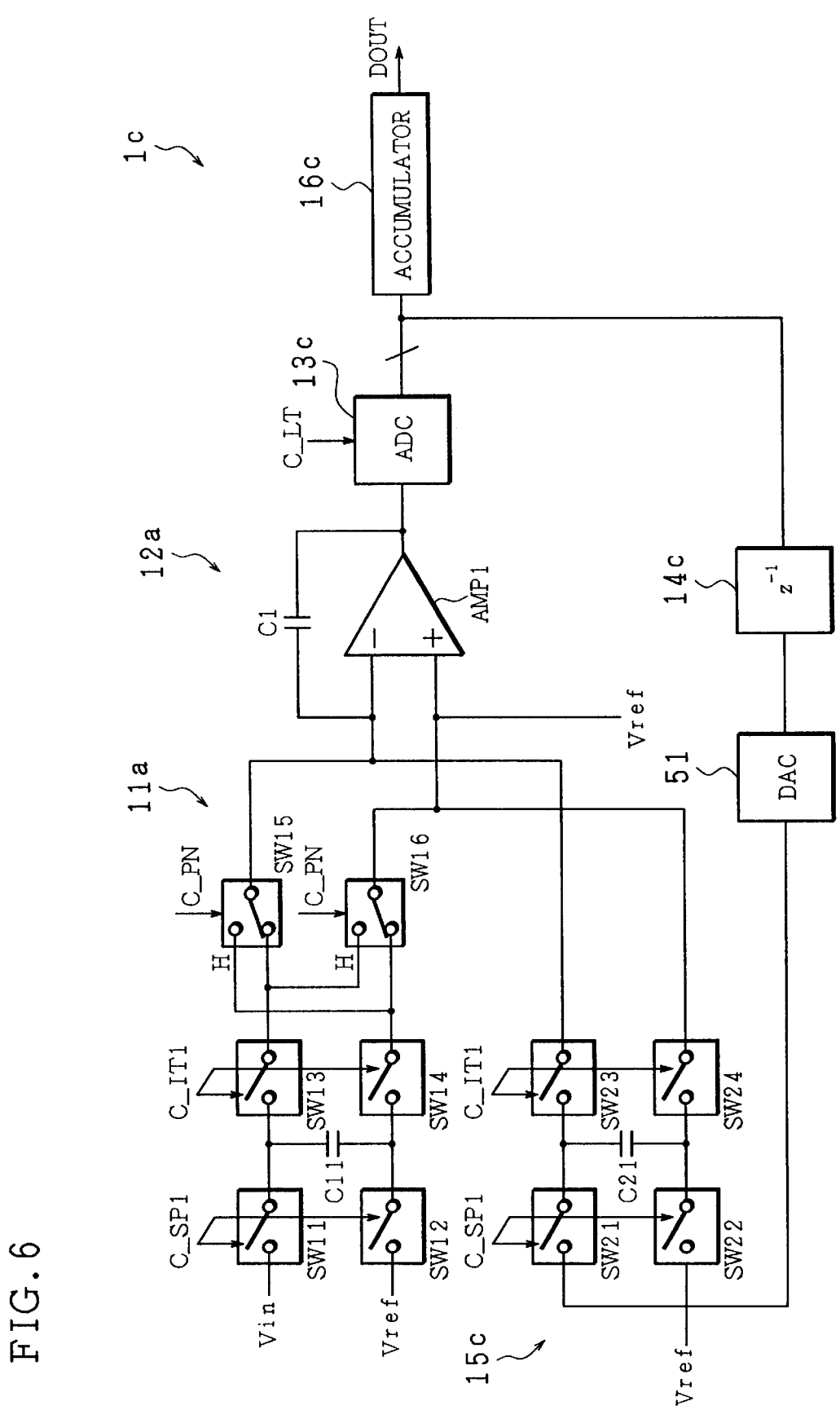
FIG. 6 is a circuit diagram showing the chief structure of a recycling integrator correlator according to a further embodiment of the present invention.

As a further specific example of the recycling integrator correlator 1 shown in FIG. 1, the present embodiment will explain, with reference to FIG. 6, a structure in which the quantization circuit 13 is realized as an ADC (Analog/Digital Converter) 13c. Members having functions equivalent to those shown in the drawings pertaining to the foregoing embodiments will be given the same reference symbols, and explanation thereof will be omitted here.

In the present embodiment, the ADC 13c quantizes the output Y(i) from the analog signal integrator 12a in N levels, and a digital accumulator 16c is provided as the digital accumulator shown in FIG. 1. Furthermore, a digital delay circuit 14c delays a digital value outputted by the ADC 13c.

Furthermore, a negative feedback circuit 15c according to the present embodiment, in addition to the structure of the negative feedback circuit 15a shown in FIG. 2, also includes a DA (Digital/Analog) converter 51, which, based on a signal outputted by the digital delay circuit 14c, produces an analog feedback signal L. When the output value of the ADC 13c sent to the DAC 51 via the digital delay circuit 14c is Q(i−1), the DAC 51 produces a feedback signal SL of signal level −(Q(i−1)·D+Z)/A, which is applied to the switch SW21 in place of the voltage VL shown in FIG. 2.

Furthermore, since the DAC 51 directly produces the feedback signal SL, the negative feedback circuit 15c of the present embodiment omits the multiplexers SW25 and SW26 shown in FIG. 2. Thus the switch SW23 is connected to the inverting input terminal of the MOS operational amplifier AMP1, and the switch SW24 is connected to the non-inverting input terminal thereof. Furthermore, since, in contrast to the second embodiment above, negative feedback of the feedback signal SL takes place during each period of the periodic clock C_LT, the switches SW21 and SW22 of the negative feedback circuit 15c are closed and opened based on the control signal C_SP1, as are the switches SW11 and SW12 of the analog signal integrator 12a.

Accordingly, the output signal Y(i) from the analog signal integrator 12a is as shown by Eq. (13) below.

$$Y(i)=Y(i-1)+(C11/C1)\cdot a(i)\cdot Vin(i)-(C21/C1)\cdot(Q(i-1)\cdot D+Z)/A \quad (13)$$

If the values of each of the circuit elements are set the same as in Eq. (10) above, then Eq. (12) can be rewritten as Eq. (14) below, which is equivalent to Eq. (3) above.

$$Y(i)=Y(i-1)+A\cdot a(i)\cdot Vin(i)-(Q(i-1)\cdot D+Z) \quad (14)$$

As a result, the digital value Dout outputted by the counter 16c after input of the entirety of a binary code sequence of sequence length M is ΣQ(i), and, as shown in Eq. (6) above, the digital value is a quantized index of the correlation value between the analog input signal and the binary code sequence at a quantization interval of |D/A|, and thus the quantization error is less than 2·Δ/|A|. Incidentally, A is a maximum quantization error of the ADC 13c, and D is a quantization interval of the ADC 13c.

Fifth Embodiment

Figure 7:
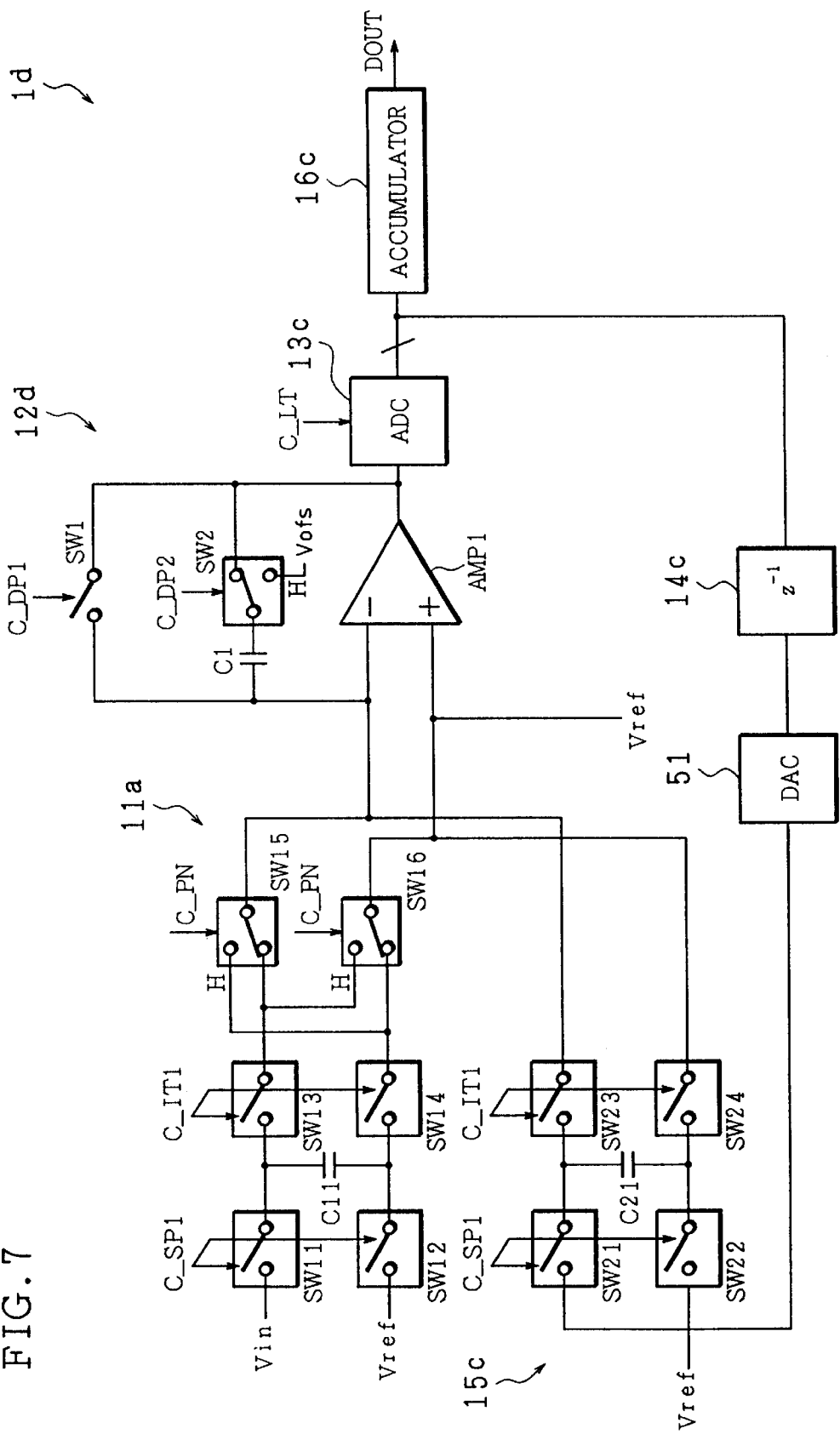
FIG. 7 is a circuit diagram showing the chief structure of a recycling integrator correlator according to a further embodiment of the present invention.

As a further specific example of the recycling integrator correlator 1 shown in FIG. 1, the present embodiment will explain, with reference to FIG. 7, a structure in which, every time correlation calculation begins, the output of the analog signal integrator 12 is adjusted in accordance with the output Q(0) of the quantization circuit 13. The present embodiment explains an example in which, in the recycling integrator correlator 1c shown in FIG. 6, the analog signal integrator 12a is replaced by an analog signal integrator 12d, but equivalent effects can be obtained even if the present embodiment is applied to the other recycling integrator correlators 1 (1a and 1b).

The analog signal integrator 12d according to the present embodiment is structured as the foregoing analog signal integrator 12a, except that it is further provided with a switch SW1 which, when directed to close by a control signal C_DP1, creates a short circuit between the inverting input terminal and the output terminal of the MOS operational amplifier AMP1, and with a multiplexer SW2 provided between the output terminal of the MOS operational amplifier AMP1 and the integrating capacitor C1. The multiplexer SW2 is controlled by a control signal C_DP2, and the common connection thereof is connected to the integrating capacitor C1. Furthermore, one of the individual contacts of the multiplexer SW2 is connected to the output terminal of the MOS operational amplifier AMP1, and the other receives application of an offset voltage Vofs.

In the foregoing structure, while the recycling integrator correlator 1d is performing correlation calculation, the switch SW1 is open, and the multiplexer SW2 selects the output terminal side. Therefore, in the recycling integrator correlator 1d, as in the recycling integrator correlators (1a through 1c) described in the foregoing embodiments, there is no hindrance to output of the correlation value as the digital value Dout.

Then, when correlation calculation is completed, prior to commencement of the next correlation calculation, the switch SW1 is closed, and the multiplexer SW2 selects the offset voltage Vofs side. Consequently, regardless of the voltage of input offset of the MOS operational amplifier AMP1, charge of a quantity necessary to bring the output voltage and the offset voltage Vofs into conformity with one another are accumulated in the inverting input terminal of the MOS operational amplifier AMP1. Next, at the beginning of the next correlation calculation, the switch SW1 and the multiplexer SW2 are switched while maintaining the charge of the inverting input terminal (by, for example, opening the switch SW1 and then causing the multiplexer SW2 to select the output terminal side). In this way, the output voltage Y(0) of the analog signal integrator 12d and the offset voltage Vofs can be brought into conformity with one another at the beginning of correlation calculation, regardless of the voltage of input offset.

Here, the offset voltage Vofs is set so that Vofs=K·D, where K is an integer the ADC 13c is able to output.

Furthermore, the output Q(0) of the ADC 13c at the beginning of correlation calculation is set so as to be equal to K. As a result, at the beginning of correlation calculation, it can be ensured that Y(0)−Q(0)·D=0. Thus, as shown by Eq. (8) above, the quantization error of the recycling integrator correlator 1d is less than Δ/|A|, and is thus reduced to half as much as in the case of, for example, the recycling integrator correlator 1c.

Sixth Embodiment

In the recycling integrator correlators (1a through 1d) according to the second through fifth embodiments above, low frequency noise generated in the MOS operational amplifier AMP1, such as input offset accumulates during integration processing, and may cause error in the correlation value outputted by the recycling integrator correlator.

In the present embodiment, in contrast, a structure which makes use of CDS (Correlated Double Sampling) to mitigate this accumulation error will be explained with reference to FIGS. 8 and 9. Members having functions equivalent to those in the drawings pertaining to the foregoing embodiments will be given the same reference symbols, and explanation thereof will be omitted here.

Figure 8:
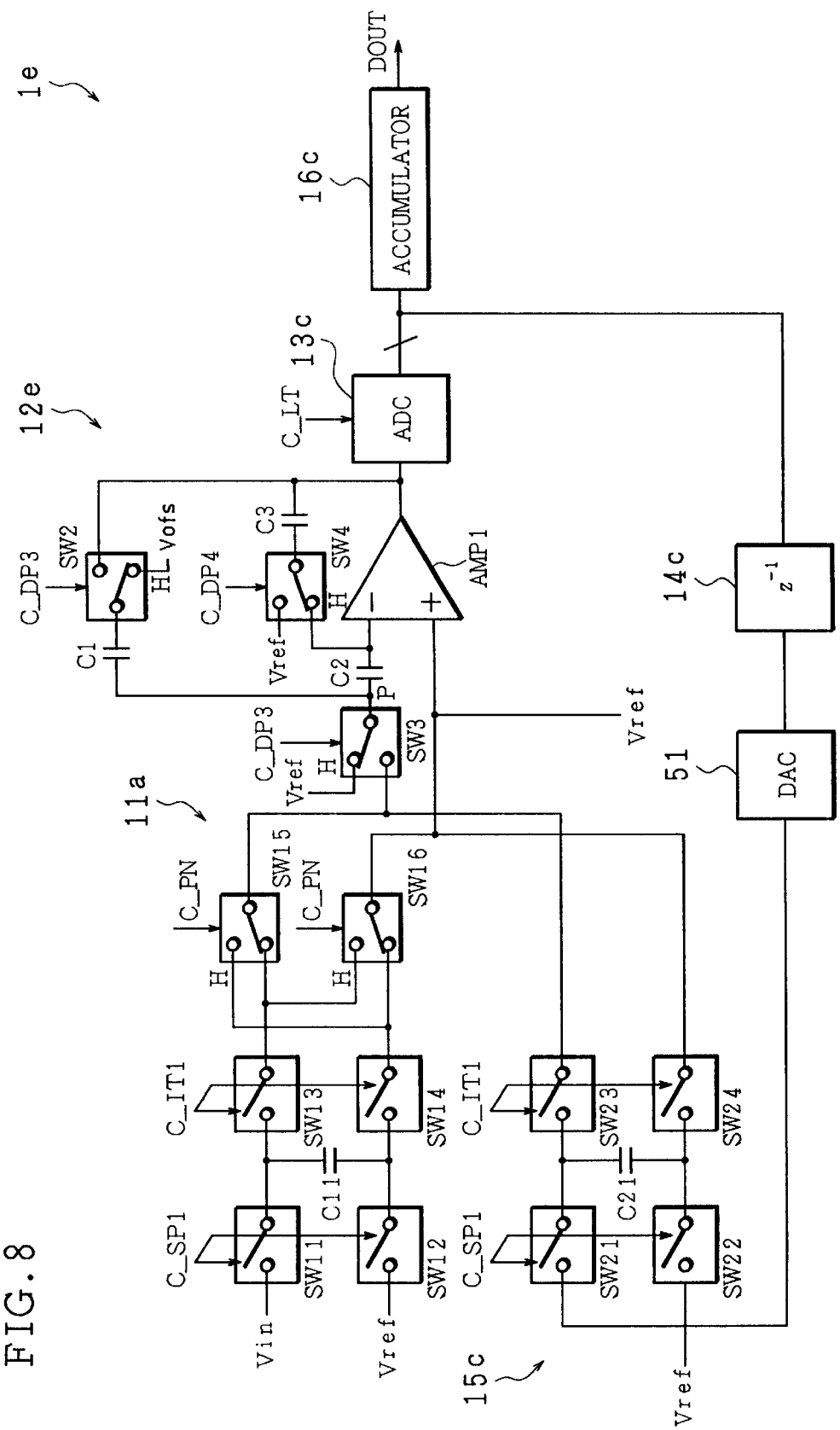
FIG. 8 is a circuit diagram showing the chief structure of a recycling integrator correlator according to a further embodiment of the present invention.

Specifically, as shown in FIG. 8, an analog signal integrator 12e according to the present embodiment includes, in addition to the MOS operational amplifier AMP1 and the integrating capacitor C1, a multiplexer SW2 like that in the analog signal integrator 12d shown in FIG. 7. Furthermore, output from the multiplier 11a, the negative feedback circuit 15c, etc. is sent, via a multiplexer SW3 and a storage capacitor C2, to the inverting input terminal of the MOS operational amplifier AMP1. Here, the integrating capacitor C1 according to the present embodiment is connected to a point (node P) connecting the multiplexer SW3 and the storage capacitor C2. Furthermore, the offset voltage Vofs, the initial value K of the ADC 13c, etc. are set as in the fifth embodiment above.

The multiplexer SW3, like the multiplexer SW2, operates based on a control signal C_DP3, and its common connection is connected to the storage capacitor C2. Furthermore, one of its individual contacts is connected to the multiplexer SW15 of the multiplier 11a, and to the switch SW23 of the negative feedback circuit 15c. Its other individual contact receives application of a reference voltage Vref.

Furthermore, the inverting input terminal and the output terminal of the MOS operational amplifier AMP1 are connected to each other via a multiplexer SW4 and a capacitor C3. The multiplexer SW4 operates based on a control signal C_DP4, and its common connection is connected to the capacitor C3. Furthermore, one of its individual contacts is connected to the inverting input terminal of the MOS operational amplifier AMP1, and its other individual contact receives application of the reference voltage Vref.

Figure 9:
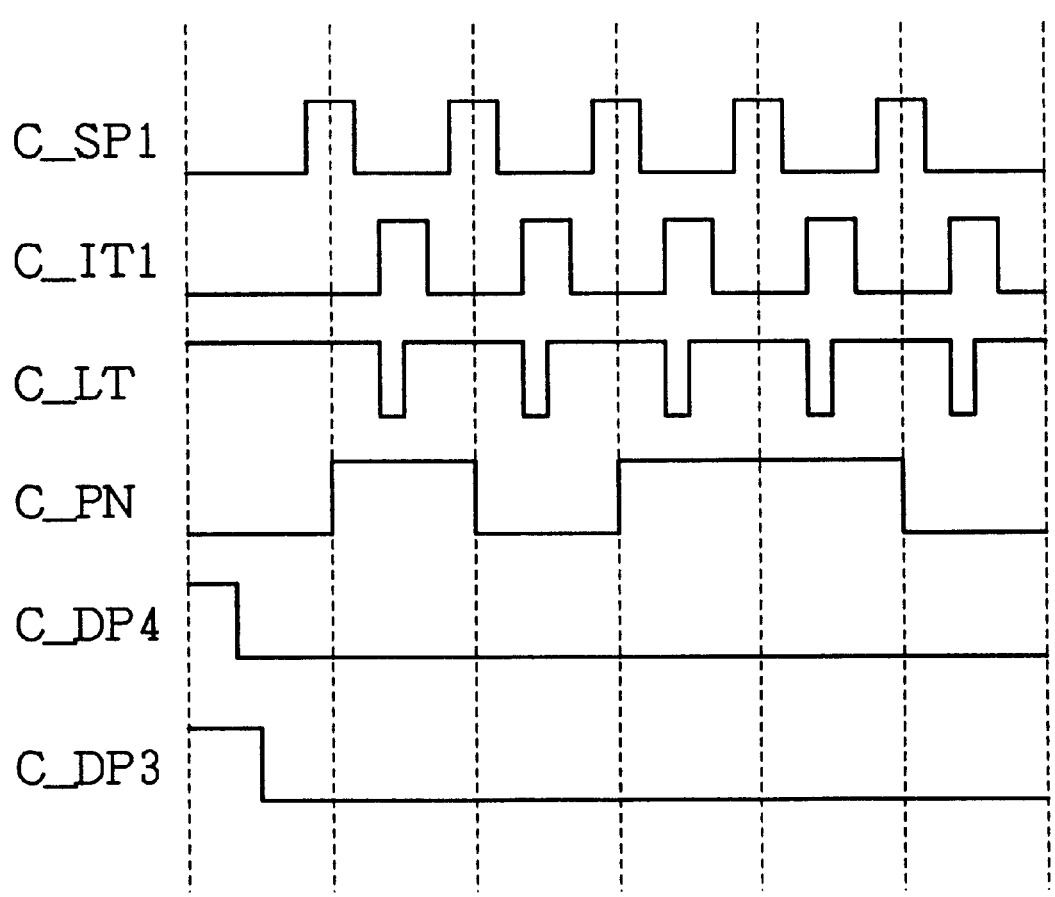
FIG. 9 is a timing chart showing the operations of the foregoing recycling integrator correlator.

With the foregoing structure, as shown in FIG. 9, during a period after completion of correlation calculation and prior to commencement of the next correlation calculation, the control signals C_DP3 and C_DP4 are "high," the multiplexer SW3 selects its Vref side, the multiplexer SW4 selects its capacitor C2 side, and the multiplexer SW2 selects its Vofs side. In this state, noise resulting from the various foregoing factors is stored as a voltage in the storage capacitor C2.

Then, after the control signal C_DP4 changes to "low," the control signal C_DP3 also changes to "low" level. Consequently, the stored voltage remains in the storage capacitor C2, each of the multiplexers SW2 through SW4 is switched, and the potential at node P is maintained at Vref.

Thus, by activating CDS operation before commencement of each correlation calculation, the recycling integrator correlator 1e is enabled to perform correlation calculation without the adverse effects of noise. As a result, the precision of correlation calculation can be further improved over that in the fifth embodiment above.

Seventh Embodiment

The second through sixth embodiments above explained cases in which a single-ended differential amplifier (the MOS operational amplifier AMP1) is used in the analog signal integrators 12a, 12d, and 12e, but it is also possible to use a fully differential amplifier whose input signal and output signal are both differential signals. Equivalent effects can be obtained by application of a fully differential amplifier to any of the embodiments above, but the following will explain an example of its application to the third embodiment above.

Figure 10:
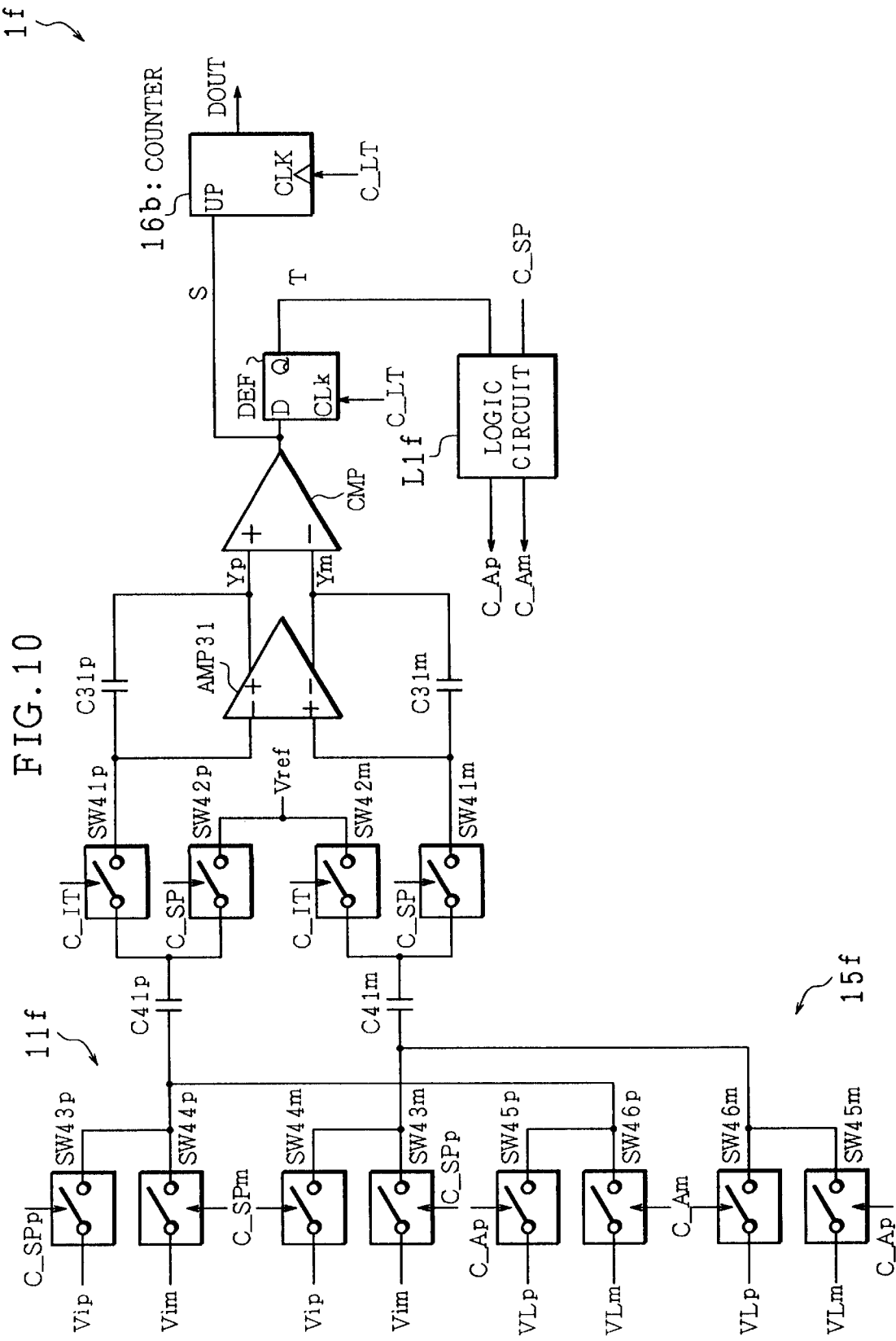
FIG. 10 is a circuit diagram showing the chief structure of a recycling integrator correlator according to a further embodiment of the present invention.

As shown in FIG. 10, in a recycling integrator correlator 1f according to the present embodiment, the analog input signal x(i) is applied as a differential signal (Vip−Vim) made up of a positive input signal Vip and a negative input signal Vim, and an analog signal integrator 12f is structured as a fully differential circuit.

Specifically, the analog signal integrator 12f includes a fully differential amplifier AMP31; an integrating capacitor C31p provided between a non-inverted output terminal and an inverting input terminal of the fully differential amplifier AMP31; an integrating capacitor C31m provided between an inverted output terminal and a non-inverting input terminal of the fully differential amplifier AMP31; a sampling capacitor C41p corresponding to the inverting input terminal; and a sampling capacitor C41m corresponding to the non-inverting input terminal. Here, the inverted output terminal of the analog signal integrator 12f is connected to a non-inverting input terminal of the MOS comparator CMP, and the non-inverted output terminal of the analog signal integrator 12f is connected to an inverting input terminal of the MOS comparator CMP. By this arrangement, when the non-inverted output of the analog signal integrator 12f exceeds its inverted output, the MOS comparator CMP outputs a signal Q(i) of "high" level.

The switch SW41p connects the sampling capacitor C41p and the inverting input terminal as enabled by the control signal C_IT that indicates integration, and is open at other times, and on the output side of the sampling capacitor C41p (toward the inverting input terminal) is provided a switch SW42p which, when a control signal C_SP shows sampling, closes to apply a reference voltage Vref.

To the input side of the sampling capacitor C41p, on the other hand, are connected a switch SW43p which, during application of a control signal C_SPp (indicating that a sampled binary code sequence value a(i) is +1) closes to apply the foregoing positive input signal Vip; and a switch SW44p which, during application of a control signal C_SPm (indicating that a sampled value is −1), closes to apply the foregoing negative input signal Vim.

Figure 11:
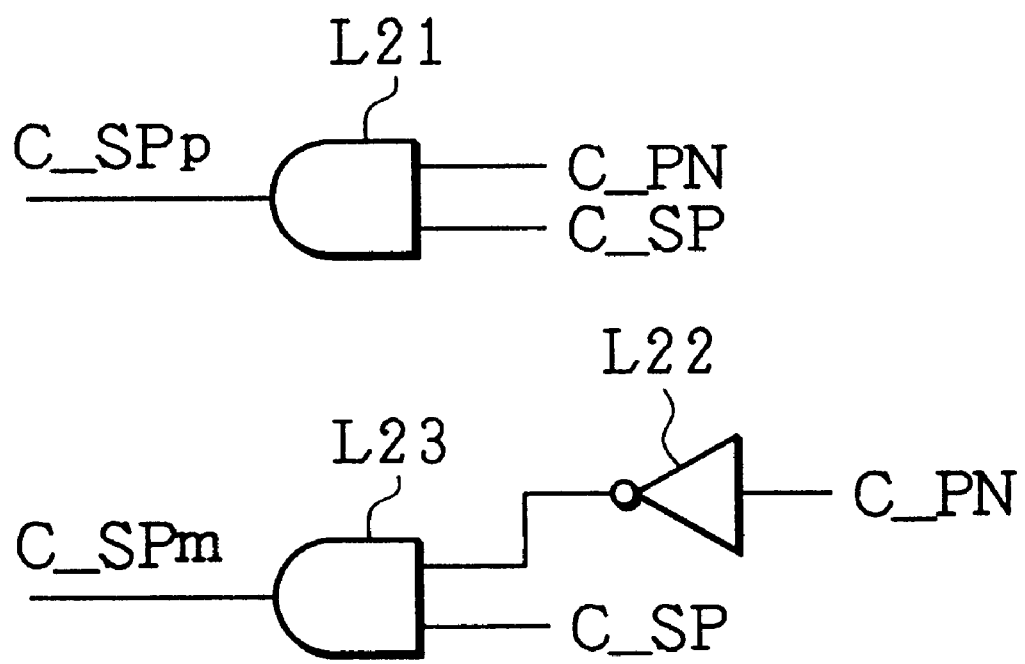
FIG. 11 is a circuit diagram showing an example of a structure for a control circuit provided in the foregoing recycling integrator correlator.

The control signal C_SPp is produced by, for example, an AND circuit L21 shown in FIG. 11, which calculates a logical AND of the control signal C_PN and the control signal C_SP. Furthermore, the control signal C_SPm is produced by, for example, an AND circuit L23, which calculates a logical AND of the control signal C_SP and an output of a NOT circuit L22 which computes the NOT of the control signal C_PN.

Furthermore, in the present embodiment, the feedback voltage VL shown in FIG. 4 is also furnished by a differential voltage (VLp−VLm), and, by applying this differential voltage (VLp−VLm) when the control signal C_IT indicates sampling, the sampling capacitors C41p and C41m can be shared by the differential signal (VLp−VLm) and the differential signal (Vip−Vim).

Specifically, to the input side of the sampling capacitor C41p are connected a switch SW45p which, during application of a control signal C_Ap (indicating integration when the output signal T of the D-type flip-flop DFF is "high" level), closes to apply the positive feedback voltage VLp; and a switch SW46p which, during application of a control signal C_Am (indicating integration when the output signal T is "low" level), closes to apply the negative feedback voltage VLm.

Figure 12:
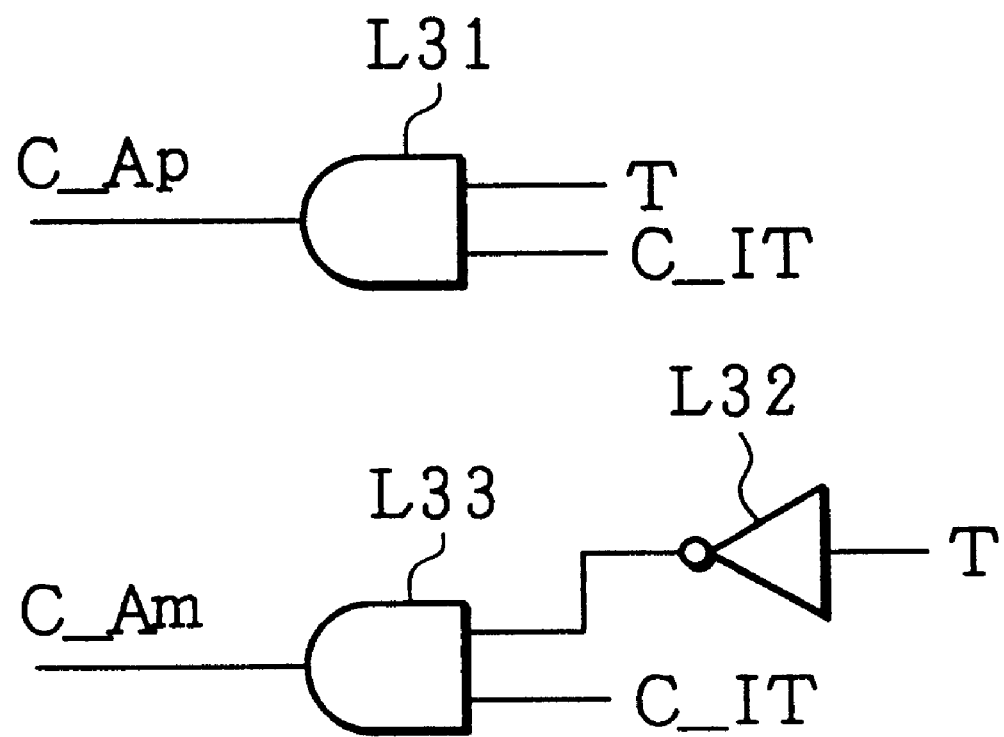
FIG. 12 is a showing an example of a structure for a logic circuit provided in the foregoing recycling integrator correlator.

The control signal C_Ap is produced by, for example, an AND circuit L31 shown in FIG. 12, which calculates a logical AND of the output signal T and the control signal C_IT. Furthermore, the control signal C_Am is produced by, for example, an AND circuit L33, which calculates a logical AND of the control signal C_IT and an output of a NOT circuit L32 which computes the NOT of the output signal T.

In addition, on the non-inverting input side, like the inverting input side, the sampling capacitor C41m is connected to switches SW41m through SW46m equivalent to the switches SW41p through SW46p. However, in order to apply signals of reverse polarity to the respective sampling capacitors C41p and C41m, the negative input signal Vim is applied to the switch SW43m (which opens based on the control signal C_SPp), and the positive input signal Vip is applied to the switch SW44m (which opens based on the control signal C_SPm). Furthermore, the negative feedback voltage VLm is applied to the switch SW45m (which opens based on the control signal C_Ap), and the positive feedback voltage VLp is applied to the switch SW46m (which opens based on the control signal C_Am).

Incidentally, in the present embodiment, the switches SW43p through SW44m are included in the multiplier 11f, and the switches SW45p through 46m are included in the negative feedback circuit 15f. Furthermore, the switches SW41p and SW41m correspond to the inverted-side and non-inverted-side first switches specified in the claims, and the switches SW42p and SW42m correspond to the inverted-side and non-inverted-side second switches specified in the claims.

Figure 13:
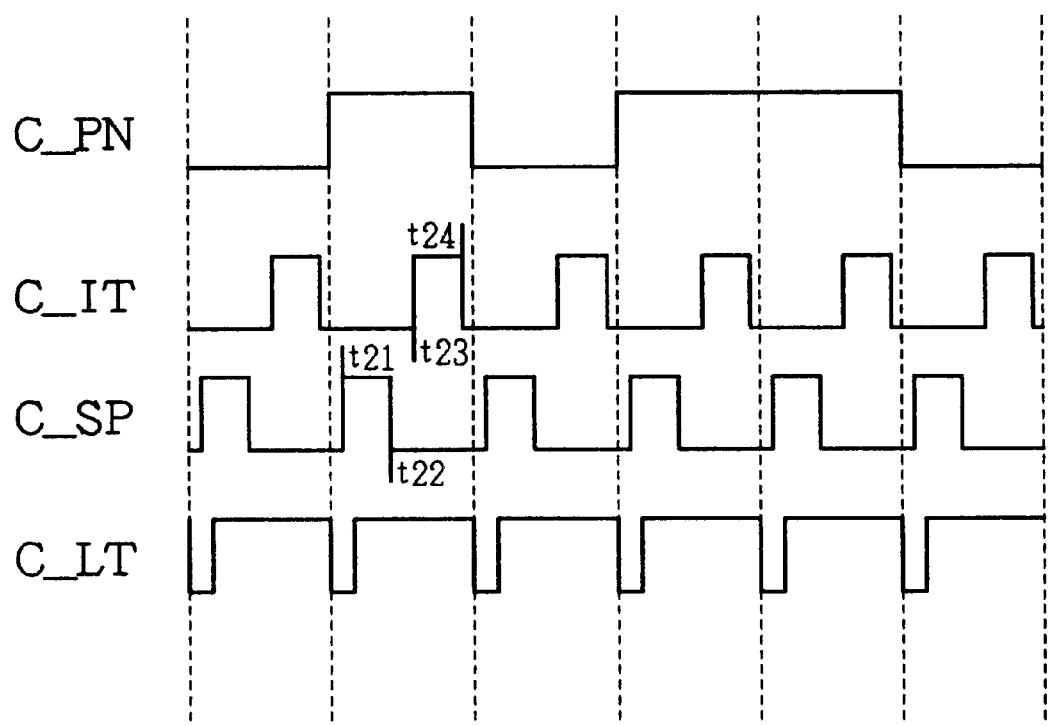
FIG. 13 is a timing chart showing the operations of the foregoing recycling integrator correlator.

With the foregoing structure, if the binary code sequence value a(i) is +1, i.e., if the control signal C_PN is "high" level, while the control signal C_SP is "high" level (in FIG. 13, the period from t21 to t22), the switches SW42p, SW42m, SW43p, and SW43m are closed, and the other switches SW41p, SW41m, and SW44p through SW46m are open. Consequently, the voltages Vip and Vref are applied to the two sides of the sampling capacitor C41p, and the voltages Vim and Vref are applied to the two sides of the sampling capacitor C41m. Thus the sampling capacitor C41p samples the input voltage Vip, and the sampling capacitor C41m samples the input voltage Vim. If, conversely, the control signal C_PN is "low" level, while the control signal C_SP is "high" level, the input voltage Vip is sampled by the sampling capacitor C41m, and the input voltage Vim is sampled by the sampling capacitor C41p. With the foregoing structure, whether the respective switches SW43p through SW44m are closed or open is not decided until after the control signal C_PN is determined. Accordingly, the timing of the control signal C_SP is set to rise to "high" level after determination of the control signal C_PN.

When, at time t22, the control signal C_SP drops to "low" level, the respective switches SW41p through SW46m are opened. Thereafter, during the period from t23 to t24, the control signal C_IT rises to "high" level, and the switches SW41p and SW41m are closed. Furthermore, during this period, if the control signal C_Ap is "high" level, the switches SW45p and SW45m are closed. Consequently, the positive feedback voltage VLp is applied, via the sampling capacitor C41p, to the inverting input terminal of the MOS operational amplifier AMP31, and the negative feedback voltage VLm is applied, via the sampling capacitor C41m, to the non-inverting input terminal of the MOS operational amplifier AMP31. In this case, the other switches SW42p through SW44m, SW46p, and SW46m are open. If, conversely, the control signal C_Am is "high" level, while the control signal C_IT is "high" level, the negative feedback voltage VLm is applied to the input side of the sampling capacitor C41p, and the positive feedback voltage VLp is applied to the input side of the sampling capacitor C41m.

Here, when the control signal C_IT rises to "high" level (at time t23, for example), since the switches SW42p and SW42m are open, there is no change in the total of the amount of charge stored in the sampling capacitor C41p plus the amount of charge stored in the integrating capacitor C31p, nor in the total of the amount of charge stored in the sampling capacitor C41m plus the amount of charge stored in the integrating capacitor C31m. Accordingly, if the values of the various circuit elements are set to C41p=C41m, A=C41p/C31p=C41m/C31m, the integration output Y(i)=Yp(i)−Ym(i) is as shown by Eq. (15) below.

$$Y(i)=Y(i-1)+A \cdot a(i) \cdot \{Vip(i)-Vim(i)\}-(2 \cdot Q(i-1)-1) \cdot A \cdot (VLp-VLm) \quad (15)$$

In Eq. (15), Q(i−1) is a function which is equal to "1" when Y(i−1)≧0, and equal to "0" when Y(i−1)<0. Furthermore, the size of each of the capacitors C31p through C41m is shown by the same reference symbol.

Here, as in the third embodiment above, the values of the voltages VLp and VLm are set so that 2·A·(VLp−VLm)=D, and Z=0. Accordingly, the integration output Y(i) is as shown in Eq. (16) below, which is equivalent to Eq. (3) above.

$$Y(i)=Y(i-1)+A \cdot a(i) \cdot x(i)-(Q(i-1) \cdot D+Z) \quad (16)$$

Accordingly, as in the third embodiment above, the count value of the counter 16b after accumulation of a sequence length of M times indicates an index of a quantized value of the correlation value between the analog input signal and the binary code sequence at a quantization interval of |D/A|, and thus the quantization error is less than 2·Δ/|A|.

Furthermore, in the present embodiment, the analog input signal x(i) is applied as a differential signal, and the analog signal integrator 12f outputs the signal Y(i) as a differential signal. As a result, the S/N ratio is improved over a case of input of a single-ended signal, thus improving the computing precision of the recycling integrator correlator 1f.

Furthermore, in the recycling integrator correlator 1f according to the present embodiment, during a period indicating integration, the feedback voltages VLp and VLm are applied to the sampling capacitors C41p and C41m. Consequently, the sampling capacitors C41p and C41m can be used in common by a path for integration of negative feedback and a path for integration of the input signals x(i)·a(i). As a result, in comparison with a case in which separate capacitors are provided for each path, the number of capacitors, which tend to occupy a relatively large surface area, can be reduced, and thus the efficiency of circuit integration can be improved.

Incidentally, as in other embodiments, in the case where a capacitor is not used in common between the circuit for integrating the negative feedback and the circuit for integrating the input signal $x(i) \cdot a(i)$, $C11/C1=A$ may not coincide with $C21/C1=A'$, and in such case, the equation (10) above becomes Eq. (17) below.

$$Y(i)=Y(i-1)+A\cdot a(i)\cdot Vin(i)-(A'/A)\cdot(Q(i-1)\cdot D+Z) \quad (17)$$

The equation for quantization which corresponds to Eq. (6) is denoted as Eq. (18) below.

$$\left| \sum_{i=1}^{M} a(i) \cdot x(i) - \frac{A'}{A} \cdot \left( \frac{D}{A} \cdot \sum_{i=1}^{M} Q(i) + \frac{M \cdot Z}{A} \right) \right| < 2 \cdot \frac{\Delta}{|A|} \quad (18)$$

wherein the quantization interval is $|(A'/A^2) \cdot D|$. Therefore, in the case where a capacitor is not used in common between the circuits, the quantization interval may be adversely affected by variations in the manufacturing process.

In contrast, according to the foregoing structure of the present embodiment, since a capacitor is used in common between the circuits, a condition of $A=A'$ can be always ensured, and thus the quantization interval can be maintained at $|D/A|$, i.e., $|2 \cdot VL|(=2 \cdot |Vip-Vim|)$ without been affected by variations in manufacturing process.

Eighth Embodiment

Figure 14:
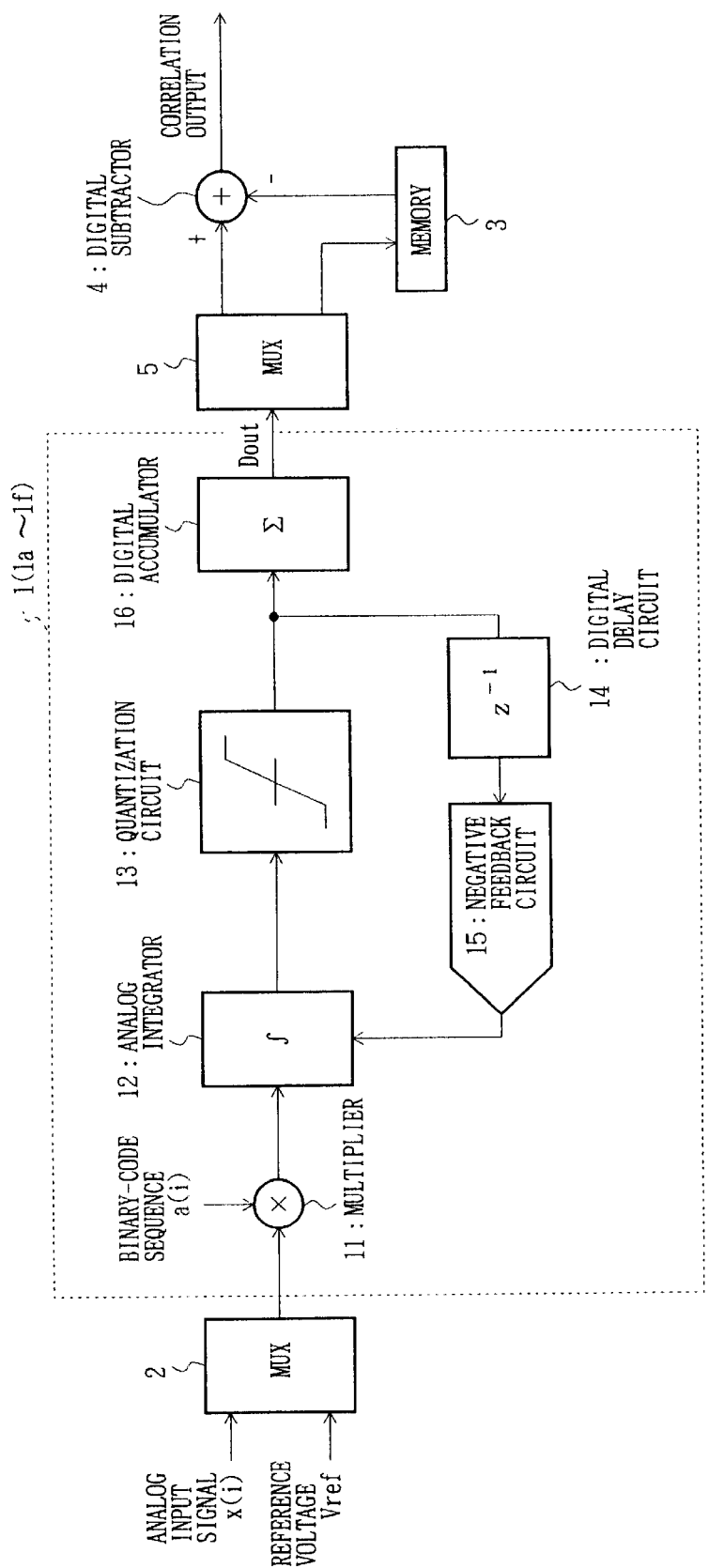
FIG. 14 is a block diagram showing the chief structure of a device, comprising a recycling integrator correlator and an offset correction circuit, according to a further embodiment of the present invention.

The present embodiment depicted in FIG. 14 will describe a structure for calculating the precision of correlation calculation of the recycling integrator correlators 1 (1a through 1f) according to the foregoing embodiments. FIG. 14 shows a case in which the recycling integrator correlator 1 shown in FIG. 1 is used.

Operations of the recycling integrator correlator 1 according to the present embodiment are divided into a calibration mode, during which a DC offset of the recycling integrator correlator is measured, and a correlation calculation mode, during which the measured DC offset is compensated and correlation calculation is performed. In the present embodiment, the recycling integrator correlator 1 further includes as measuring means and offset compensation means, a multiplexer 2 serving as measuring means and offset compensation means recited in claims, which selects an analog input signal $x(i)$ or a reference voltage Vref and inputs its selection to the recycling integrator correlator 1; a digital memory 3 which stores the DC offset; a digital subtractor 4, which subtracts an output of the digital memory 3 from the output Dout of the recycling integrator correlator 1 and outputs a correlation output; and a multiplexer 5, which sends the output Dout to the digital memory 3 or the digital subtractor 4, depending on whether or not calibration mode is in effect.

In calibration mode, the multiplexer 2 inputs a reference voltage Vref to the recycling integrator correlator 1, the recycling integrator correlator 1 calculates the correlation value, and output therefrom is sent through the multiplexer 5 and stored in the digital memory 3. With an input of the reference voltage Vref, the correlation value should theoretically be "0", and accordingly the output of the recycling integrator correlator 1 during the calibration mode can be treated as the DC offset of the recycling integrator correlator 1.

Then operations proceed to correlation calculation mode. In this mode, the multiplexer 2 is switched so as to input the analog input signal $x(i)$ to the recycling integrator correlator 1, and the multiplexer 5 is switched so as to send the output Dout of the recycling integrator correlator 1 to the digital subtractor 4. In this state, the digital subtractor 4 subtracts the DC offset value stored in the digital memory 3 from the output Dout of the recycling integrator correlator 1, and outputs the result as the correlation output. In this way, the DC offset of the recycling integrator correlator 1 is compensated, and an even more precise correlation output can be obtained.

In the calibration mode, input signals $a(i)$ and $x(i)$ may be any signals as long as a correlation value can be computed theoretically. In this case, a DC offset is derived by subtracting the theoretically computed output Dout from the actually computed output Dout. Here, if a voltage indicating an input signal $a(i)$ is a reference voltage Vref, as a theoretically correlation value is "0", an actually computed Dout is a DC offset. The above structure can contribute to compute the DC offset in a simpler manner compared with the case of using other input signals.

Ninth Embodiment

In the foregoing eighth embodiment above, a DC offset measured in the calibration mode is compensated by the digital subtractor at the second stage of the recycling integrator correlator. However, the same effect can be achieved also by adjusting an initial value of the digital accumulator at the beginning of the correlation calculation mode based on the DC offset as measured.

Figure 15:
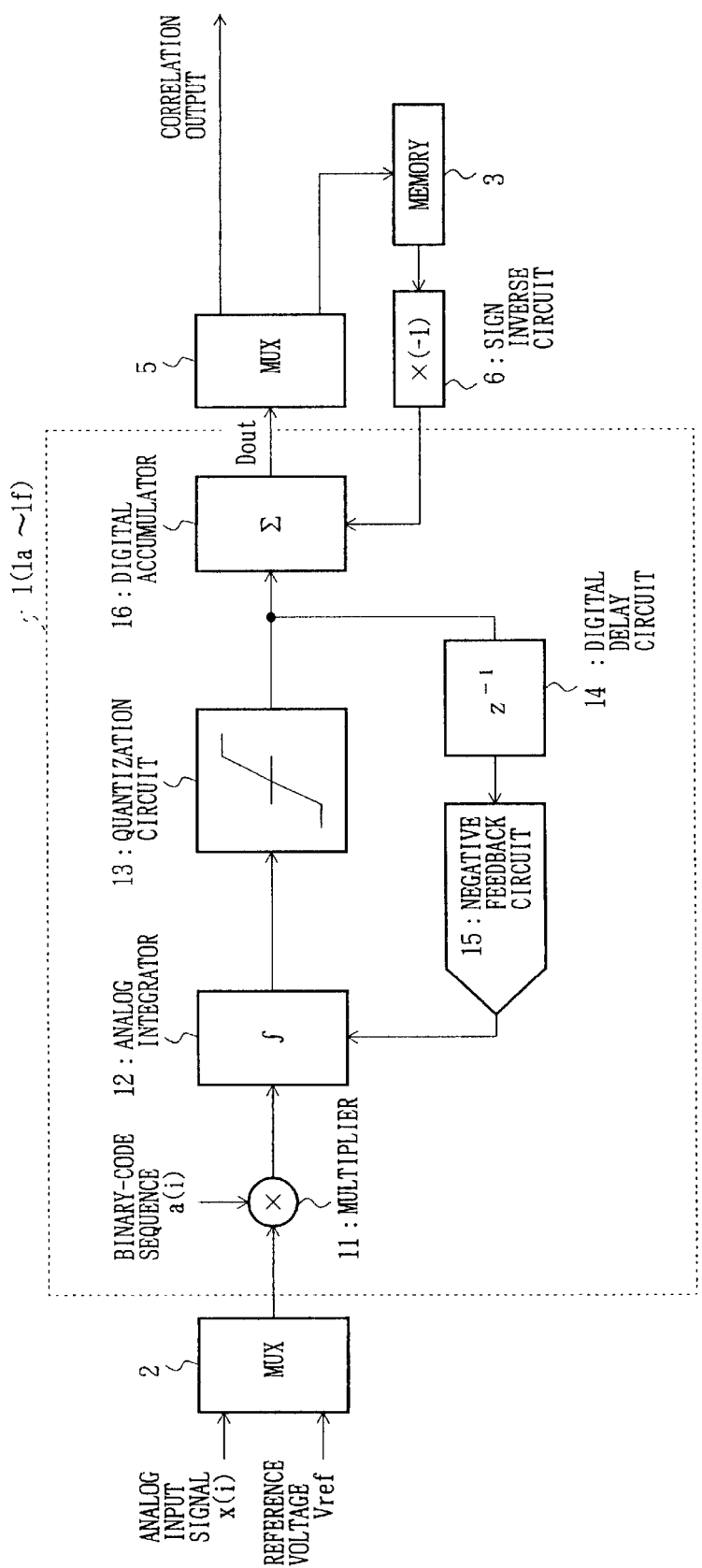
FIG. 15 is a block diagram showing the chief structure of a device, comprising a recycling integrator correlator and an offset correction circuit, according to a further embodiment of the present invention.
Figure 16:
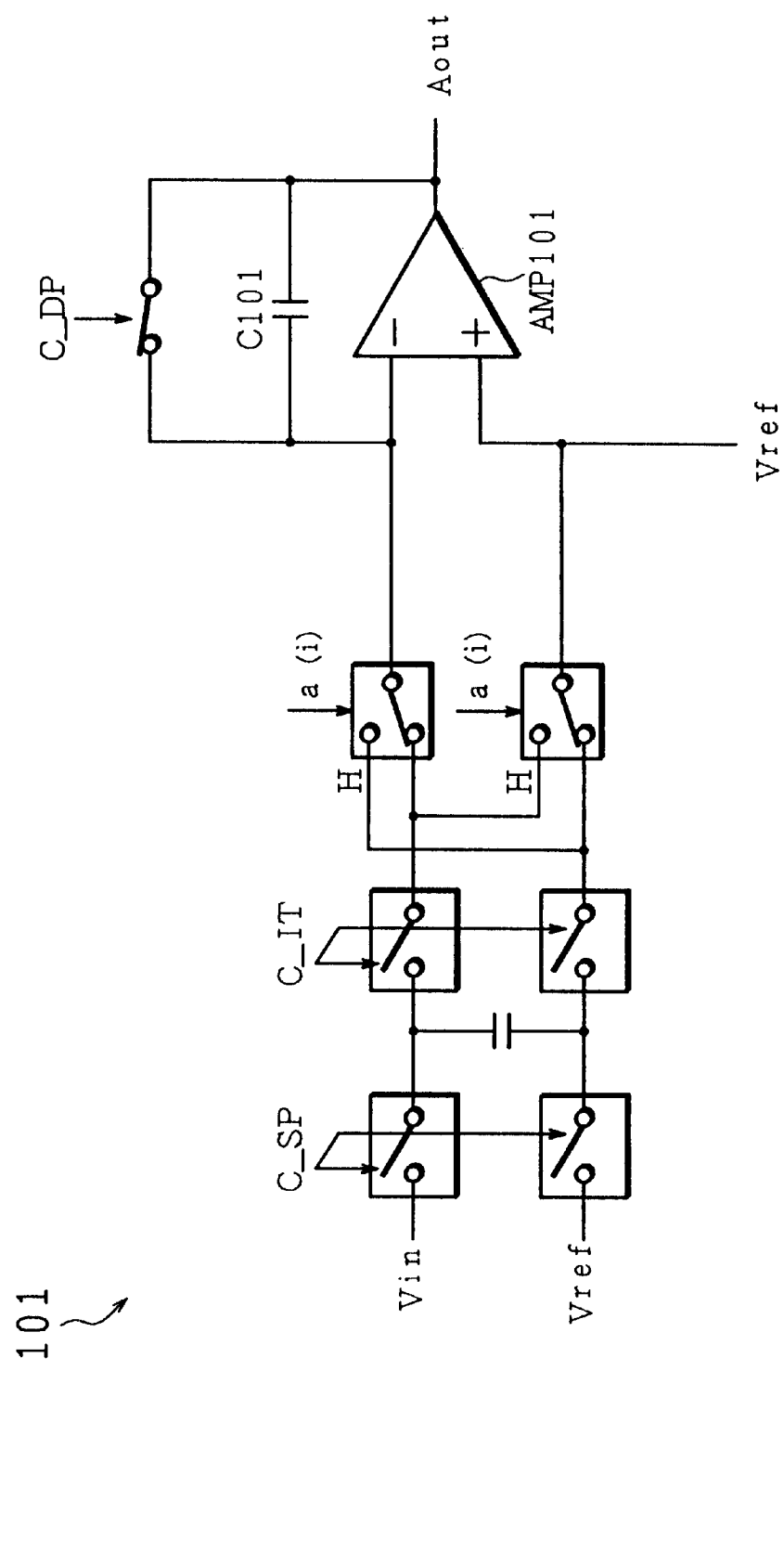
FIG. 16 is a circuit diagram showing the chief structure of a conventional correlating device.

Specifically, in the present embodiment, as shown in FIG. 15, the digital subtractor 4 shown in FIG. 14, is replaced by a sign inverse circuit (initial value setting circuit) 6 for applying a DC offset value as stored in the digital memory 3 after inverting its sign.

In the above structure, a DC offset of the recycling integrator correlator 1 is measured in the calibration mode in the same manner as the foregoing eighth embodiment, and the DC offset as measured is stored in the digital memory 3. Furthermore, at a start of the correlation calculation mode, the sign inverse circuit 6 reads the DC offset value as stored in the digital memory 3, and initializes the digital accumulator 16 of the recycling integrator correlator 1 with the value with the inversed sign. As a result, the DC offset of the recycling integrator correlator 1 is compensated, and a more precise correlation output can be obtained as in the foregoing structure of the eighth embodiment. In this case, as an output of the multiplexer 5 serves as an index indicating a correlation value, a higher speed computation can be achieved compared with the case of providing the digital subtractor 4 at the second stage of the multiplexer 5.

Furthermore, in the case of applying the sign inverse circuit 6 to the foregoing fifth or sixth embodiment in which the digital accumulator 16 (16c) is initialized to satisfy $Q(0)=K$, if a value stored in the digital memory 3 is the value 0, the digital accumulator 16(16c) is initialized with the initial value K–O. In this case, in addition to the effect of compensating the DC offset, a quantization error can be reduced to half which offers a even more precise correlation output.

The embodiments and concrete examples of implementation discussed in the foregoing detailed explanation of the present invention serve solely to illustrate the technical contents of the present invention, which should not be narrowly interpreted within the limits of such concrete examples, but rather may be applied in many variations without departing from the spirit of the present invention and the scope of the patent claims set forth below.

What is claimed is:

1. A correlator for calculating a correlation value between an analog input signal and a code sequence with respect to time, comprising:
   a multiplier, which multiplies the analog input signal by a code from the code sequence;
   an analog integrator;
   a quantization circuit, which quantizes an integrated value from said analog integrator;
   a digital accumulator, which accumulates digital values outputted by said quantization circuit, and outputs a result of accumulation as the correlation value; and
   a negative feedback circuit, which converts the digital values outputted by said quantization circuit to an analog value of inverse polarity;
   wherein said analog integrator integrates a sum of a negative feedback signal outputted by said negative feedback circuit and an output from said multiplier.

2. The correlator set forth in claim 1, wherein:
   said analog integrator is a switched-capacitor type analog integrator in which the charge accumulated in a first sampling capacitor during a sampling period, representing the analog input signal is transferred to a integrator capacitor during a integration period; and
   said multiplier is a first multiplexer, which, in accordance with a value of the code sequence, selects, among two terminals of said first sampling capacitor, a terminal thereof connected to said integrating capacitor during the integration period.

3. The correlator set forth in claim 1, wherein:
   said quantization circuit quantizes the integrated value into one of three values in an upper part above a predetermined range, and in a lower part below the predetermined range, respectively;
   said negative feedback circuit decreases the integrated value if the integrated value is in the upper part range, and conversely increases the integrated value if the integrated value is in the lower part range; and
   said digital accumulator outputs as the correlation value a value obtained by subtracting a number of times the integrated value was in the lower part below the predetermined range from a number of times the integrated value was in the upper part above the predetermined range.

4. The correlator set forth in claim 3, wherein:
   said analog integrator is a switched-capacitor type analog integrator in which an amount of charge accumulated on a first sampling capacitor so as to correspond to the analog input signal during a sampling period is moved to an integrating capacitor during an integration period;
   said multiplier is a first multiplexer, which, in accordance with a value of the code sequence, selects, among two terminals of said first sampling capacitor, a terminal thereof connected to said integrating capacitor during the integration period;
   said quantization circuit includes a first comparator that compares the integrated value with an upper limit above the predetermined range, and a second comparator that compares the integrated value with a lower limit below the predetermined range; and
   said digital accumulator is an up-and-down counter, which increases a count value when said first comparator determines that the integrated value is in the upper part above the predetermined range, and decreases the count value when said second comparator determines that the integrated value is in the lower part below the predetermined range; and
   said negative feedback circuit includes:
      a second sampling capacitor having two terminals, which, when the integrated value has been determined to be in the upper part above or lower part below the predetermined range, receive, during a sampling period, application of a voltage corresponding to a shift amount; and
      a second multiplexer, which, according to whether the integrated value is in the upper part above or the lower part below the predetermined range, selects, between the two terminals of said second sampling capacitor, a terminal connected to said integrating capacitor.

5. The correlator set forth in claim 1, wherein:
   said quantization circuit quantizes the integrated value into one of two values above a predetermined threshold value and below the threshold value, respectively;
   said negative feedback circuit outputs a signal which decreases the integrated value by a shift amount when the integrated value is above the threshold value, and outputs a signal which increases the integrated value by the shift amount when the integrated value is below the threshold value; and
   said digital accumulator outputs a number of times the integrated value was above the threshold value as the correlation value.

6. The correlator set forth in claim 5, wherein:
   said analog integrator is a switched-capacitor type analog integrator, in which an amount of charge accumulated on a first sampling capacitor so as to correspond to the analog input signal during a sampling period is moved to an integrating capacitor during the integration period;
   said multiplier is a first multiplexer, which, in accordance with a value of the code sequence, selects, among two terminals of said first sampling capacitor, a terminal thereof connected to said integrating capacitor during the integration period;
   said quantization circuit includes a comparator which compares the threshold value with the integrated value;
   said digital accumulator includes a counter, which increases a count value when said comparator determines that the integrated value is above the threshold value; and
   said negative feedback circuit includes:
      a second sampling capacitor having two terminals, which receive, during a sampling period, application of a voltage corresponding to the shift amount; and
      a second multiplexer, which, according to whether the integrated value is above or below the threshold value, selects, of the two terminals of the second sampling capacitor, a terminal connected to said integrating capacitor.

7. The correlator set forth in claim 1, wherein:
   said quantization circuit is an AD converter, which quantizes into levels of not less than 4;
   said digital accumulator is a digital adder, which adds outputs from said quantization circuit; and
   said negative feedback circuit is a DA converter, which converts the digital value outputted by said quantization circuit to an analog value of inverse polarity.

8. The correlator set forth in claim 1, further comprising:

initialization means, that at the beginning of each cycle of the code sequence, adjust at least one of the integrated value of said analog integrator and a value indicated by an output of said quantization circuit, so that the integrated value and the value indicated by the output are equal.

9. The correlator set forth in claim 8, wherein:

said analog integrator includes an integrating capacitor, connected between the input and output of the component operational amplifier, which stores charge corresponding to the integrated value; and said initializing means include:
- a switch, which, during initializing, short-circuits said integrating capacitor; and
- a multiplexer, which applies a predetermined offset voltage to an output side of said integrating capacitor during initialization, and connects the output side of said integrating capacitor with an output from said analog integrator during correlation computation.

10. The correlator set forth in claim 8, wherein:

said initializing means, by means of CDS (Correlated Double Sampling) operation, adjust the integrated value of said analog integrator, thus canceling DC offset and low-frequency noise of said analog integrator.

11. The correlator set forth in claim 1, wherein:

said analog integrator is a fully-differential type analog integrator, which receives a fully-differential analog input signal; and a sampling capacitor is shared between a path for integration of the analog input signal and a path for integration of the negative feedback signal.

12. The correlator set forth in claim 1, wherein said analog integrator includes:

a fully-differential type amplifier;

an inverted-side integrating capacitor provided between an inverting input terminal and a non-inverted output terminal of said amplifier;

a non-inverted-side integrating capacitor provided between a non-inverting input terminal and an inverted output terminal of said amplifier;

an inverted-side sampling capacitor corresponding to said inverting input terminal;

a non-inverted-side sampling capacitor corresponding to said non-inverting input terminal;

an inverted-side first switch, provided between an output of said inverted-side sampling capacitor and said inverting input terminal of said amplifier, which is closed during the integration period;

an inverted-side second switch which, during a sampling period, applies the predetermined reference voltage to the output of said inverted-side sampling capacitor;

a non-inverted-side first switch, provided between an output of said non-inverted-side sampling capacitor and said non-inverting input terminal of said amplifier, which is closed during an integration period; and a non-inverted-side second switch which, during the sampling period, applies the predetermined reference voltage to the output of said non-inverted-side sampling capacitor;

wherein said inverted-side and non-inverted-side sampling capacitors receive input of a differential signal from said multiplier during the sampling period, and receive input of a differential signal from said negative feedback circuit during the integration period.

13. The correlator set forth in claim 1, further comprising:

measuring means, which, prior to correlation computation, measure offset error of said correlator; and offset compensation means, which adjust a result of computation by said correlator, thus cancelling the offset error based on the offset error as measured.

14. The correlator as set forth in claim 13, wherein:

said measuring means includes a digital memory, which stores the measured offset error as a digital value; and said offset compensation means includes a subtractor, which, during the correlation computation, subtracts the digital value stored in said digital memory from an output of said correlator, thus canceling the offset error.

15. The correlator as set forth in claim 13, wherein:

said measuring means includes a digital memory, which stores the measured offset error as a digital value; and said offset compensation means includes an initial value setting circuit for shifting the initial value of said digital accumulator at the beginning of the correlation computation by the digital value in a direction of cancelling the offset error.

* * * * *